(12) United States Patent
Fujiyama et al.

(10) Patent No.: US 12,326,734 B2
(45) Date of Patent: Jun. 10, 2025

(54) VEHICLE CONTROL SYSTEM

(71) Applicant: PANASONIC INTELLECTUAL PROPERTY MANAGEMENT CO., LTD., Osaka (JP)

(72) Inventors: Jun Fujiyama, Kanagawa (JP); Naoya Koike, Saitama (JP); Jun Ogawa, Kanagawa (JP); Shinya Ota, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/420,304

(22) Filed: Jan. 23, 2024

(65) Prior Publication Data

US 2024/0160216 A1    May 16, 2024

Related U.S. Application Data

(63) Continuation of application No. 17/354,276, filed on Jun. 22, 2021, now Pat. No. 12,111,666, which is a
(Continued)

(30) Foreign Application Priority Data

Dec. 27, 2018  (JP) .................................. 2018-246032
Dec. 27, 2018  (JP) .................................. 2018-246033

(51) Int. Cl.
*G05D 1/02*    (2020.01)
*G05D 1/00*    (2006.01)
(Continued)

(52) U.S. Cl.
CPC ......... *G05D 1/0278* (2013.01); *G05D 1/0223* (2013.01); *G05D 1/248* (2024.01);
(Continued)

(58) Field of Classification Search
CPC ........ G05D 1/0278; G05D 1/65; G05D 1/248; G05D 1/0223; H04W 4/80; H04W 4/40; H04W 12/06
See application file for complete search history.

(56) References Cited

U.S. PATENT DOCUMENTS 6,700,475 B1    3/2004   Geber
10,450,021 B2  10/2019   Anuth et al.
(Continued)

FOREIGN PATENT DOCUMENTS

CN    1776170 A    5/2006
CN  101594423 A   12/2009
(Continued)

OTHER PUBLICATIONS

International Search Report issued in International Bureau of WIPO Patent Application No. PCT/JP2019/044197, dated Jan. 28, 2020, along with an English translation thereof.
(Continued)

*Primary Examiner* — Mathew Franklin Gordon
(74) *Attorney, Agent, or Firm* — GREENBLUM & BERNSTEIN, P.L.C.

(57) ABSTRACT

A vehicle control system includes: a vehicle including an operation device; a first communication device; and a second communication device. In a case in which the first communication device is positioned in a first area containing a position of the vehicle, the vehicle operates in an operation waiting state in which the operation device is allowed to receive an operation. In a case in which the second communication device is positioned in a second area contained in the first area and smaller than the first area, the vehicle operates in the operation waiting state. In a case in which the first communication device is positioned in the first area and the second communication device is positioned in the second area, the second communication device generates a
(Continued)

notification indicating that the vehicle is in the operation waiting state.

13 Claims, 29 Drawing Sheets

Related U.S. Application Data continuation of application No. PCT/JP2019/044197, filed on Nov. 11, 2019.

(51) Int. Cl.
    *G05D 1/248*     (2024.01)
    *G05D 1/65*     (2024.01)
    *H04W 4/40*     (2018.01)
    *H04W 4/80*     (2018.01)
    *H04W 12/06*     (2021.01)

(52) U.S. Cl.
    CPC ................ *G05D 1/65* (2024.01); *H04W 4/40* (2018.02); *H04W 4/80* (2018.02); *H04W 12/06* (2013.01)

(56) References Cited

U.S. PATENT DOCUMENTS

| | | |
|---|---|---|
| 2005/0024181 A1 | 2/2005 | Hofbeck et al. |
| 2006/0043181 A1 | 3/2006 | Naito et al. |
| 2006/0103240 A1 | 5/2006 | Naito et al. |
| 2008/0194292 A1 | 8/2008 | Naito et al. |
| 2015/0091698 A1 | 4/2015 | Du |
| 2015/0379859 A1 | 12/2015 | Nespolo |
| 2017/0118178 A1 | 4/2017 | Fruehling et al. |
| 2017/0232933 A1 | 8/2017 | Nishidai et al. |
| 2018/0118294 A1 | 5/2018 | Anuth et al. |
| 2019/0080539 A1 | 3/2019 | Yoshikawa et al. |
| 2019/0168712 A1 | 6/2019 | Yakovenko et al. |
| 2019/0266896 A1 | 8/2019 | Kobayashi |
| 2020/0035048 A1 | 1/2020 | Onishi |
| 2020/0044215 A1 | 2/2020 | Shimizu et al. |

FOREIGN PATENT DOCUMENTS

| | | |
|---|---|---|
| CN | 104709238 A | 6/2015 |
| CN | 104980274 A | 10/2015 |
| CN | 107507317 A | 12/2017 |
| CN | 207377291 U | 5/2018 |
| CN | 108839635 A | 11/2018 |
| CN | 110203168 A | 9/2019 |
| DE | 10125064 A1 | 11/2002 |
| DE | 102007058481 A | 6/2009 |
| EP | 2026287 B1 | 11/2017 |
| JP | S61-137976 A | 6/1986 |
| JP | 2000-297569 A | 10/2000 |
| JP | 2006-063676 A | 3/2006 |
| JP | 2007-048248 A | 2/2007 |
| JP | 2008-310766 A | 12/2008 |
| JP | 2013-068058 A | 4/2013 |
| JP | 2016-015724 A | 1/2016 |
| JP | 2016-056614 A | 4/2016 |
| JP | 2016-204839 A | 12/2016 |
| JP | 2017-141639 A | 8/2017 |
| JP | 2017-149218 A | 8/2017 |
| JP | 2017-193884 A | 10/2017 |
| JP | 2018-522778 A | 8/2018 |
| WO | 2018/190168 A1 | 10/2018 |
| WO | WO2018/190186 A1 | 10/2018 |

OTHER PUBLICATIONS

Written Opinion of the International Searching Authority issued in International Bureau of WIPO Patent Application No. PCT/JP2019/044197, dated Jan. 28, 2020.

Office Action issued in Chinese family member Patent Appl. No. 201980086312.X, dated Feb. 8, 2022, along with an English translation thereof.

Office Action issued in Japanese family member Patent Application No. 2023-095807, dated Feb. 6, 2024, along with an English translation thereof.

Office Action issued in Chinese family member Patent Appl. No. 202211242374.5, dated Jan. 22, 2025, alone with an English translation thereof.

FIG. 4
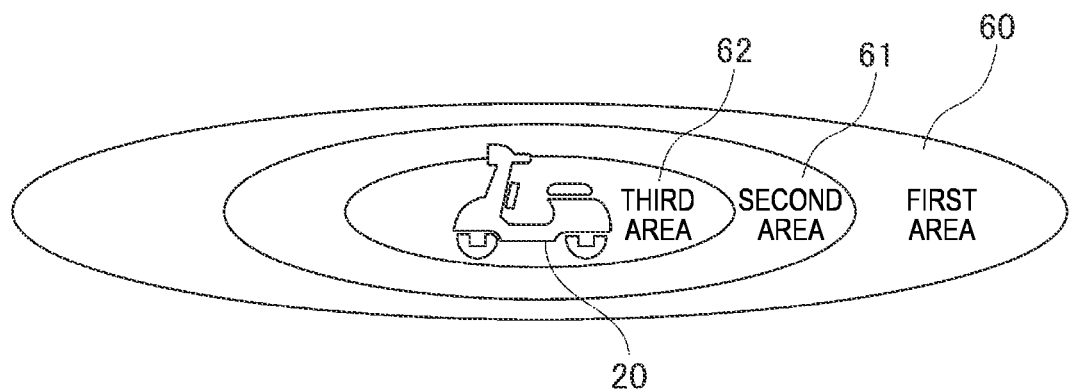
FIG. 5A  FIG. 5B
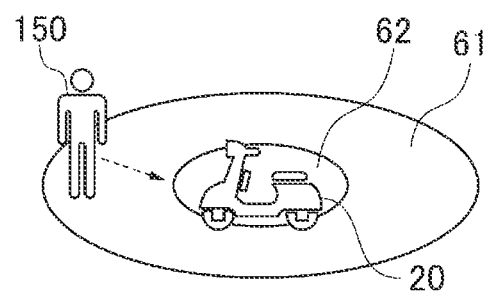
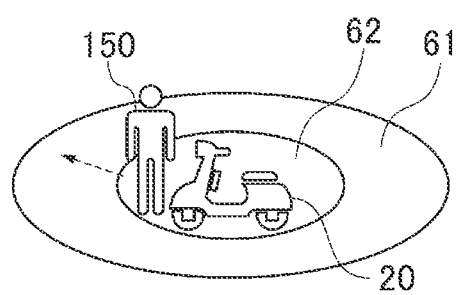
FIG. 6
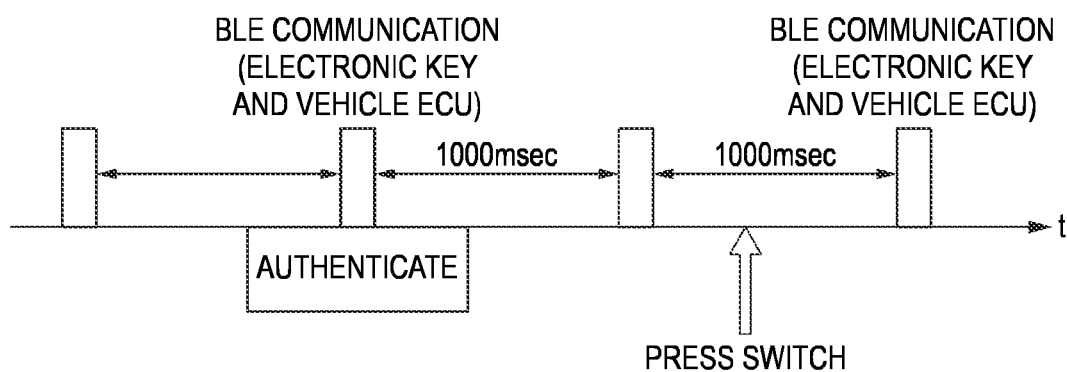

VEHICLE CONTROL ENABLED

VEHICLE CONTROL DISABLED

VEHICLE CONTROL ENABLED

VEHICLE CONTROL SYSTEM

CROSS-REFERENCE TO RELATED APPLICATIONS

The present application is a continuation of U.S. patent application Ser. No. 17/354,276, filed Jun. 22, 2021, which is a continuation of International Patent Application No. PCT/JP2019/044197, filed Nov. 11, 2019, which claims the benefit of priority of Japanese Patent Application No. 2018-246032, filed Dec. 27, 2018, and Japanese Patent Application No. 2018-246033, filed Dec. 27, 2018. The entire contents of each of the above-mentioned documents is incorporated herein by reference.

FIELD

The present disclosure relates to a vehicle control system suitable for a vehicle such as a motorcycle and an automobile.

BACKGROUND

FIG. 32 is a diagram showing a schematic configuration of a vehicle control system in the related art. A vehicle control system 100 shown in FIG. 32 is applied to a two-wheeled vehicle 110. The vehicle control system 100 includes a switch 120 provided in the vehicle 110, a vehicle electronic control unit (ECU) 130 mounted in the vehicle 110, and an electronic key 140 carried by a user 150 of the vehicle 110. For example, a low frequency (LF) of 125 kHz and a radio frequency (RF) of 315 MHz or 433 MHz are used for communication between the vehicle ECU 130 and the electronic key 140. The LF is used for communication from the vehicle ECU 130 to the electronic key 140, and the RF is used for communication from the electronic key 140 to the vehicle ECU 130.

FIG. 33 is a diagram showing LF/RF communication and authentication timing in the vehicle 110 in FIG. 32. In FIG. 33, the user 150 of the vehicle 110 carries the electronic key 140 and approaches the vehicle 110. Then, the user 150 presses the switch 120, thus LF/RF communication between the electronic key 140 and the vehicle ECU 130 is started, and authentication of the electronic key 140 is executed. After the authentication is executed, the vehicle 110 enters a control enabled state. As described above, the user 150 presses the switch 120 of the vehicle 110 in a state in which the user 150 carries the electronic key 140, thus the LF/RF communication between the electronic key 140 and the ECU 130 is started and authentication of the electronic key 140 is executed. After the authentication is executed, the vehicle 110 enters a control enabled state.

A technique related to the vehicle control system 100 described above is disclosed in, for example, JP-A-S61-137976, JP-A-2006-63676 and JP-A-2007-48248.

A wireless key system disclosed in JP-A-S61-137976 includes a start switch, a call signal generation unit, a portable wireless device, a collation unit, and a locking/unlocking unit. The call signal generation unit transmits a plurality of types of call signals sequentially shifted in time in response to an operation of the start switch. The portable wireless device receives the call signals transmitted from the call signal generation unit and transmits a unique code signal when receiving a call signal the same as a predetermined signal. The collation unit receives the unique code signal from the portable wireless device and collates the unique code signal with a unique code stored in advance. The locking/unlocking unit locks or unlocks a door lock mechanism based on a collation result of the collation unit.

A portable device for an electronic key system disclosed in JP-A-2006-63676 includes a motion determination unit and a notification unit. The motion determination unit determines whether the portable device is moved from a stationary state. When the motion determination unit determines that the portable device is moved, the notification unit executes an operation for notifying a user that the portable device is moved.

An article carriage failure preventing device disclosed in JP-A-2007-48248 includes a wireless communication terminal device, a detection unit, a read unit, a storage unit, a notification unit, and a control unit. The wireless communication terminal device includes a memory unit that stores article information. The detection unit detects whether a person approaches or moves. The read unit reads information in the memory unit of the wireless communication terminal device. The storage unit stores data of a carried article. The notification unit compares memory data of the wireless communication terminal device with the data of the carried article, and notifies a result. The control unit controls each unit.

SUMMARY

When authentication of the electronic key 140 is executed, the vehicle 110 enters an operation waiting state, and a light emitting diode (LED) is mainly used as a method for notifying a user that the vehicle 110 enters the operation waiting state. Although the LED can blink, change a blinking cycle, or change a light color, the amount of information that can be provided to a user is small. On the other hand, a smartphone is provided with various notification device such as a display, a vibrator, a speaker, and a buzzer, and an amount of information that can be provided to a user is fairly large. More information can be provided to a user when an electronic key is provided with a notification device such as a display, a vibrator, a speaker, or a buzzer provided in the smartphone, and the user can be reliably notified that the vehicle 110 enters an operation waiting state. However, in such a case, there are problems that costs of the electronic key increase, power consumption increases, and battery life is reduced.

FIG. 34 is a diagram showing authentication timing by pressing the switch 120 when Bluetooth™ low energy (BLE, Bluetooth™ for power saving) is used for communication between the electronic key 140 and the vehicle ECU 130. As shown in FIG. 34, in a case where BLE communication at an interval of, for example, 1000 msec is executed between the electronic key 140 and the vehicle ECU 130, when the switch 120 is pressed at a time point other than a time point when the BLE communication is executed, authentication is not executed for a period of time (for example, 600 msec) from the time point when the switch 120 is pressed to a time point when subsequent BLE communication is executed. After this period of time, authentication is executed and the vehicle 110 enters a control enabled state.

An object of the present disclosure is to provide a vehicle control system capable of reliably generate a notification indicating that a vehicle enters an operation waiting state even when an electronic key is not provided with a notification device such as a display, a vibrator, a speaker, and a buzzer.

The present disclosure provides a vehicle control system including: a vehicle including an operation device; a first communication device configured to wirelessly communicate with the vehicle; and a second communication device configured to wirelessly communicate with the vehicle, wherein in a case in which the first communication device is positioned in a first area containing a position of the vehicle, the vehicle operates in an operation waiting state in which the operation device is allowed to receive an operation, wherein in a case in which the first communication device is not positioned in the first area, the vehicle does not operate in the operation waiting state, wherein in a case in which the second communication device is positioned in a second area contained in the first area and smaller than the first area, the vehicle operates in the operation waiting state, wherein in a case in which the second communication device is not positioned in the second area, the vehicle does not operate in the operation waiting state, and wherein in a case in which the first communication device is positioned in the first area and the second communication device is positioned in the second area, the second communication device generates a second notification indicating that the vehicle is in the operation waiting state.

According to the present disclosure, it is possible to reliably generate a notification indicating that a vehicle is in an operation waiting state even when an electronic key is not provided with a user interface such as a display, a vibrator, and a speaker.

BRIEF DESCRIPTION OF DRAWINGS

FIG. 4 is a diagram showing a vehicle controllable area provided in the vehicle control system according to the first embodiment.

FIGS. 5A and 5B are diagrams showing a concept of hysteresis in which an operation waiting state continues in the vehicle control system according to the first embodiment.

FIG. 6 is a diagram showing BLE communication timing and authentication timing in the vehicle control system according to the first embodiment.

DETAILED DESCRIPTION

Hereinafter, a vehicle control system according to an embodiment of the present disclosure (hereinafter, referred to as "the present embodiment") will be specifically described in detail with reference to the drawings as appropriate. An unnecessarily detailed description may be omitted. For example, detailed description of a well-known matter or a repeated description of substantially the same configuration may be omitted. This is to avoid unnecessary redundancy in the following description and to facilitate understanding for those skilled in the art. The accompanying drawings and the following description are provided for a thorough understanding of the present disclosure for those skilled in the art, and are not intended to limit the subject matter in the claims.

Hereinafter, preferred embodiments of the present disclosure will be described in detail with reference to the drawings.

First Embodiment

Figure 1:
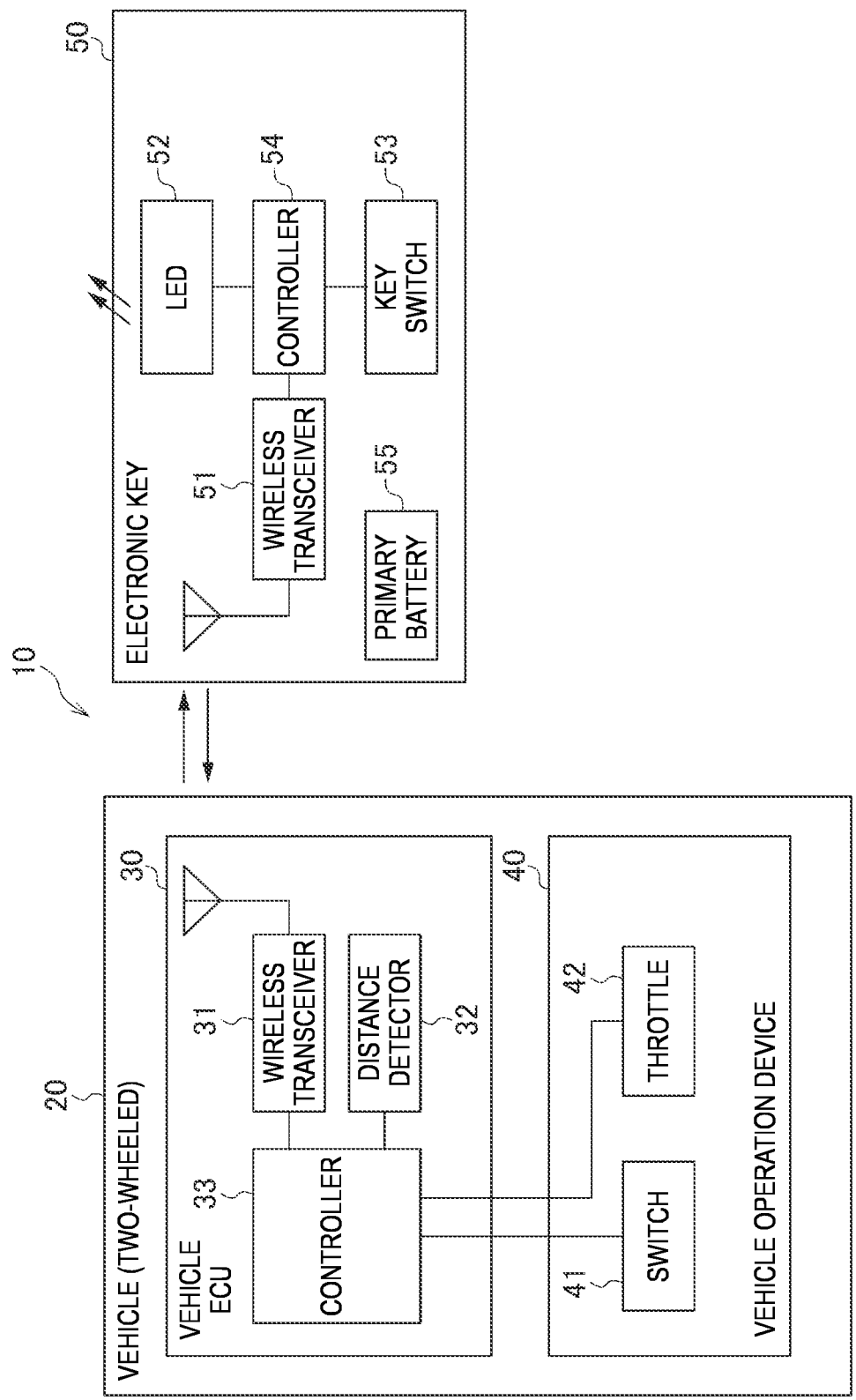
FIG. 1 is a block diagram showing a schematic configuration of a vehicle control system according to a first embodiment.

Hereinafter, a vehicle control system according to a first embodiment will be described with reference to the drawings. FIG. 1 is a block diagram showing a schematic configuration of a vehicle control system 10 according to the first embodiment. In FIG. 1, the vehicle control system 10 according to the present embodiment is applied to a two-wheeled vehicle 20. The vehicle control system 10 includes a vehicle ECU 30 mounted in the vehicle 20, a vehicle operation device (operation device) 40 provided in the vehicle 20, and an electronic key (communication device) 50 carried by a user of the vehicle 20. The vehicle operation device 40 includes a switch 41 and a throttle 42. The switch 41 receives an operation (first operation) for bringing the vehicle 20 into a control enabled state. The throttle 42 receives an operation (second operation) for moving the vehicle 20 forward, and the vehicle moves forward by receiving a throttle operation when the vehicle 20 is in a control enabled state.

Figure 32:
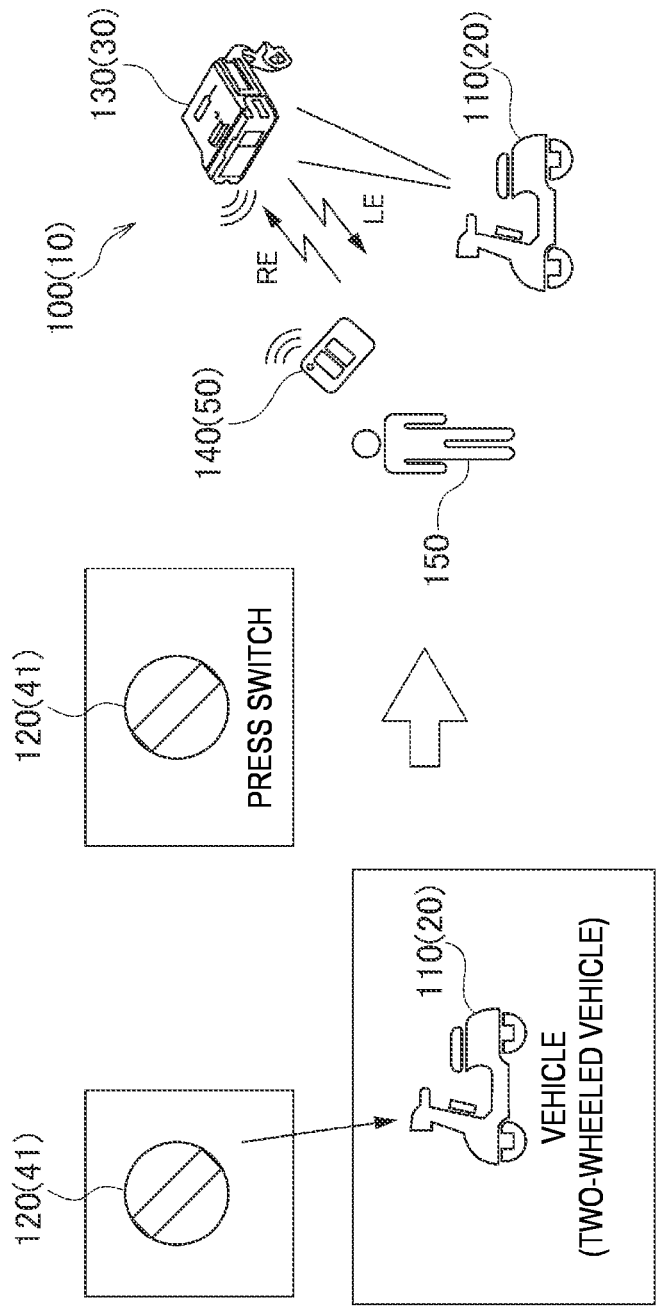
FIG. 32 is a diagram showing a schematic configuration of a vehicle control system in the related art.
Figure 33:
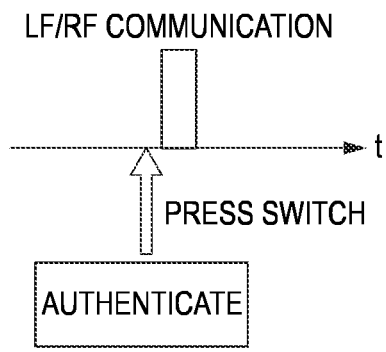
FIG. 33 is a diagram showing LF/RF communication and authentication timing in a vehicle in FIG. 32.

Since an overall configuration of the vehicle control system 10 according to the present embodiment is the same as the configuration in FIG. 32 described above, the overall configuration in FIG. 32 will be used. In order to distinguish the vehicle control system 10 according to the present embodiment from the vehicle control system 100 in the related art, reference numerals of elements constituting the vehicle control system 10 according to the present embodiment are parenthesized.

Figure 2:
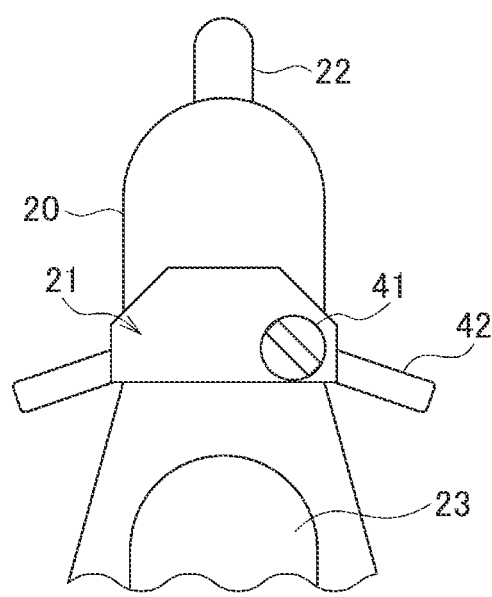
FIG. 2 is a top view showing a front portion of a vehicle body of a vehicle to which the vehicle control system according to the first embodiment is applied.

FIG. 2 is a top view showing a front portion of a vehicle body of the vehicle 20. In FIG. 2, since the vehicle 20 is a two-wheeled vehicle, the throttle 42 is disposed at a right end portion of a handle 21, and the switch 41 is disposed inside the throttle 42. The vehicle 20 includes a front wheel 22 and a fuel tank 23.

In FIG. 1, the vehicle ECU 30 includes a wireless transceiver 31 that executes wireless communication complying with Bluetooth™ between the vehicle ECU 30 and the electronic key 50, a distance detector 32 that detects a distance to the electronic key 50, and a controller 33 that acquires a switch signal when the switch 41 and the throttle 42 of the vehicle operation device 40 are operated and controls the wireless transceiver 31 and the distance detector 32. The Bluetooth™ adopted in the wireless transceiver 31 uses a communication method for performing periodic communication, and a frequency is in a band of 2.4 GHz. A communication distance is about 100 m. In order to improve the battery life of the electronic key 50, Bluetooth™ Low Energy for achieving power saving of Bluetooth™ may be used.

The distance detector 32 measures a distance to the electronic key 50 according to a method using received signal strength indication (RSSI), time of flight (TOF), phase information of radio waves, or the like. The RSSI is used for the purpose of controlling a transmission range or the like in wireless communication such as wireless LAN or Bluetooth™ The TOF transmits radio waves to an object and measures a distance to the object during a period of time required for a response from the object. In the method using phase information of radio waves, a distance is estimated based on wavelength and phase information for each frequency. Measurement of the distance to the electronic key 50 may be executed at the electronic key 50 side instead of the vehicle ECU 30 side, or may be executed at both the vehicle ECU 30 side and the electronic key 50 side. In the vehicle control system 10 according to the present embodiment, the measurement is executed on the vehicle ECU 30 side. An example in which the measurement of the distance to the electronic key 50 is executed on the electronic key 50 side and an example in which the measurement of the distance to the electronic key 50 is executed at both the vehicle ECU 30 side and the electronic key 50 side will be described later.

The controller 33 includes a central processing unit (CPU) (not shown), a read only memory (ROM) that stores a program for controlling the CPU, and a random access memory (RAM) used for an operation of the CPU. The controller 33 receives switch signals output from the switch 41 and the throttle 42 of the vehicle operation device 40.

The electronic key 50 includes a wireless transceiver 51 that executes wireless communication complying with Bluetooth™ between the electronic key 50 and the vehicle ECU 30, an LED (display) 52 that displays information indicating that the vehicle 20 is in an operation waiting state, a key switch 53, a controller 54 that acquires a switch signal when the key switch 53 is operated and controls the wireless transceiver 51 and the LED 52, and a primary battery 55 that supplies power to each part of the electronic key 50. As described above, in order to improve the battery life of the electronic key 50, Bluetooth™ Low Energy for achieving power saving is preferably used. The controller 54 includes a CPU (not shown), a ROM that stores a program for controlling the CPU, and a RAM used for an operation of the CPU.

Figure 3:
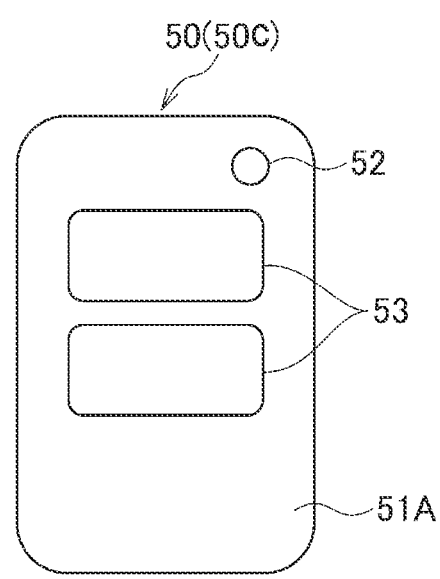
FIG. 3 is a plan view showing an external appearance of an electronic key provided in the vehicle control system according to the first embodiment.

FIG. 3 is a plan view showing an external appearance of the electronic key 50. In FIG. 3, the electronic key 50 has a rectangular housing (first housing) 51A. The LED 52 is disposed at an upper right side of a front face side of the housing 51A, and the key switch 53 is disposed below the LED 52. The electronic key 50 may or may not have a unit for measuring a distance between the electronic key 50 and the vehicle ECU 30.

Figure 34:
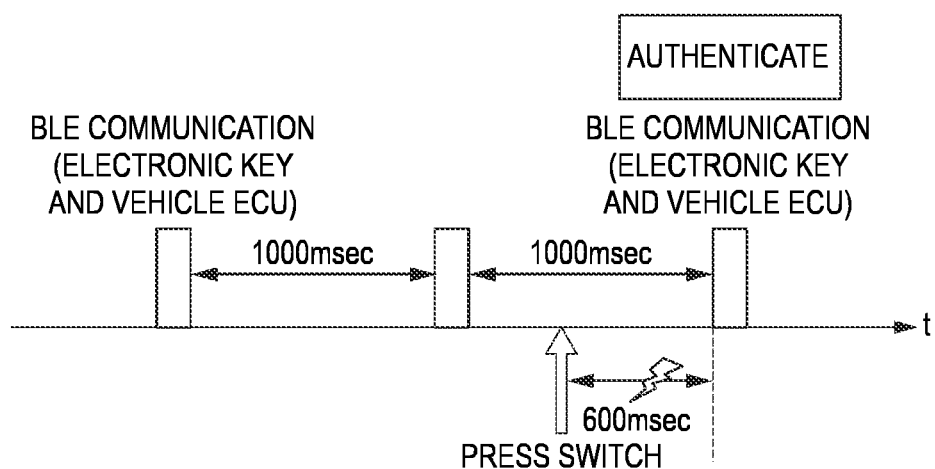
FIG. 34 is a diagram showing authentication when a switch is pressed in a case where BLE is used for communication between an electronic key and a vehicle ECU.

Here, in a communication method of executing periodic communication such as Bluetooth™ communication, it may take some time from when the switch 41 of the vehicle operation device 40 is pressed to when the vehicle 20 enters a control enabled state. In the example shown in FIG. 34 described above, BLE communication and authentication are executed after, for example, 600 msec since the switch is pressed, and thereafter, the vehicle enters a control enabled state. That is, even when the switch is pressed, if this is not timing when BLE communication is executed, authentication is not executed until subsequent BLE communication is executed and it takes some time to bring the vehicle into a control enabled state. In this manner, in a method of performing authentication when the switch is pressed, a period of time from when the switch is pressed to when the vehicle enters an activated state is long. In order to shorten the period of time from when the switch is pressed to when the vehicle enters an activated state, an interval for periodic communication between the electronic key and the vehicle may be reduced. In this case, both the electronic key and the vehicle consume a large amount of currents, resulting in poor battery life.

On the other hand, depending on a method of detecting a position of the electronic key 50, there is a possibility that an error occurs in a position detection due to an influence of surroundings of a human body or the like, and a vehicle controllable area may change depending on how the electronic key 50 is carried. That is, a communication area may vary greatly depending on the position of the electronic key 50. Therefore, it is not suitable to use a method of detecting a position of the electronic key after an operation of a driver, such as pressing the switch. Even the electronic key is present close to the vehicle, the electronic key may be out of a communication area due to an influence of a human body. It is hard to receive the influence of a human body by using a LF/RF method in communication between the vehicle and the electronic key, and a communication area can be stabilized. However, as described in the related art, it takes some time up to when the vehicle enters a control enabled state by using the method of detecting a position of the electronic key after a switch operation.

In the vehicle control system 10 according to the present embodiment, it is possible to shorten a period of time from when the switch 41 of the vehicle 20 is operated to when the vehicle 20 enters a control enabled state. In the vehicle control system 10 according to the present embodiment, a vehicle controllable area is provided for the vehicle 20, and the vehicle can be controlled by operating the switch 41 of the vehicle operation device 40. Here, a control of the vehicle includes "handle locking or unlocking", "trunk unlocking", "engine starting", "vehicle power supply operation", and the like.

FIG. 4 is a diagram showing a vehicle controllable area provided in the vehicle control system 10 according to the present embodiment. As shown in FIG. 4, the vehicle control system 10 according to the present embodiment includes, as vehicle controllable areas, a first area 60 including the vehicle 20, a second area 61 including the vehicle 20 and smaller than the first area 60, and a third area 62 including the vehicle 20 and smaller than the second area 61.

When the electronic key 50 enters the first area 60, connection authentication between the electronic key 50 and the vehicle 20 (actually between the electronic key 50 and the vehicle ECU 30, and the same applies to the following description) is executed. After the connection authentication is executed, when the electronic key 50 enters the third area 62, the vehicle 20 enters an operation waiting state in which the vehicle 20 can receive an operation of the operation device 40. The operation waiting state continues when the electronic key 50 enters the second area 61 excluding the third area 62. That is, there is hysteresis in which after the electronic key 50 enters the third area 62, an operation waiting state of the vehicle 20 continues even in the second area 61 excluding the third area 62. When the vehicle 20 is in an operation waiting state and the operation device 40 receives a predetermined operation, the vehicle 20 enters a control enabled state.

After the electronic key 50 enters the second area 61, when the electronic key 50 enters the first area 60 excluding the second area 61, the vehicle 20 is not in the operation waiting state. When the vehicle 20 is not in the operation waiting state, the vehicle 20 does not enter a control enabled state even if the operation device 40 receives a predetermined operation. When the electronic key 50 enters the third area 62 from the outside of the third area 62, an elapsed time is measured from that time point. During a period in which the electronic key 50 enters the third area 62 or the second area 61 excluding the third area 62, when the measured elapsed time is larger than a predetermined period of time, the vehicle 20 does not enter an operation waiting state.

In this manner, when the electronic key 50 enters the first area 60, the connection authentication between the electronic key 50 and the vehicle 20 is executed, and thereafter, when the electronic key 50 enters the third area 62, the vehicle 20 enters the operation waiting state. When the vehicle 20 is in the operation waiting state and a predetermined operation (that is, an operation of the switch 41) is executed by the operation device 40, the vehicle 20 enters a control enabled state. Even when the electronic key 50 exits the third area 62 and enters the second area 61, the vehicle 20 continues to be in a control enabled state. When the electronic key 50 exits the second area 61, the vehicle 20 is not in the control enabled state. When the vehicle 20 is not in an operation waiting state, the vehicle 20 does not enter a control enabled state even if the operation device 40 receives a predetermined operation. During a period in which the electronic key 50 enters the third area 62 or the second area 61 excluding the third area 62, when an elapsed time from when the electronic key 50 enters the third area 62 from the outside of the third area 62 is larger than a predetermined period of time, the vehicle 20 does not enter the operation waiting state.

The hysteresis in which the vehicle 20 continues to be in the control enabled state even when the electronic key 50 exits the third area 62 and enters the second area 61 is provided to solve a problem unique to Bluetooth™ communication (including BLE communication). That is, since a frequency band of Bluetooth™ is a band of 2.4 GHz and is greatly affected by a human body, the control enabled state can be maintained even when a manner of carrying the electronic key 50 is changed (in order to prevent control of the electronic key 50 from becoming disabled). As described above, there is hysteresis in which, after the electronic key 50 enters the third area 62, the vehicle 20 continues to be in the operation waiting state even when the electronic key 50 enters the second area 61 excluding the third area 62. FIGS. 5A and 5B are diagrams showing a concept of the hysteresis in which an operation waiting state is continued. As shown in FIG. 5A, a user 150 carrying the electronic key 50 enters the third area 62. Then, as shown in FIG. 5B, when the user 150 carrying the electronic key 150 enters the second area 61 excluding the third area 62, the third area 62 is enlarged and the vehicle 20 continues to be in an operation waiting state.

FIG. 6 is a diagram showing BLE communication timing and authentication timing in the vehicle control system 10 according to the present embodiment. When the electronic key 50 enters the first area 60, BLE communication between the electronic key 50 and the vehicle ECU 30 is started, and authentication of the electronic key 50 is executed. Thereafter, when the electronic key 50 enters the third area 62 and the user 150 presses the switch 41, the vehicle 20 enters a control enabled state in a period of time from this time point to subsequent BLE communication. In this manner, when the electronic key 50 enters the first area 60, authentication of the electronic key 50 is executed. After the electronic key 50 is authenticated, when the electronic key 50 enters the third area 62 and the switch 41 is pressed, the vehicle 20 enters a control enabled state.

Next, an operation of the vehicle control system 10 according to the first embodiment will be described in detail.

(Example (1) in which Notification of Transition to Vehicle Operation Waiting State is not Stopped)

Figure 7:
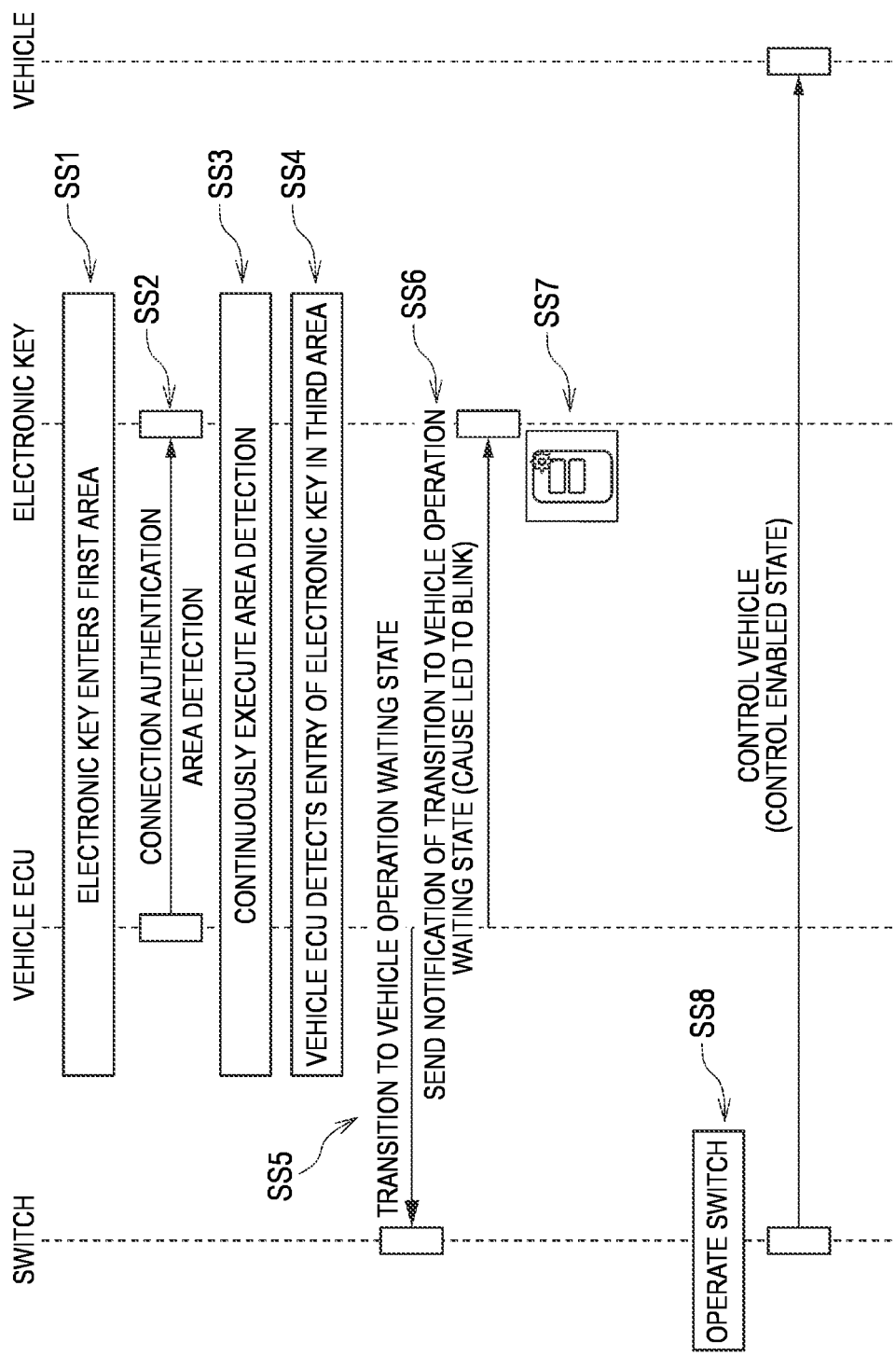
FIG. 7 is a sequence diagram showing a processing executed between a vehicle ECU and an electronic key when a notification of transition to a vehicle operation waiting state is not stopped in the vehicle control system according to the first embodiment.

FIG. 7 is a sequence diagram showing a processing executed between the vehicle ECU 30 and the electronic key 50 when a notification of transition to a vehicle operation waiting state is not stopped in the vehicle control system 10 according to the first embodiment.

In FIG. 7, when the electronic key 50 enters the first area 60 (SS1), connection authentication between the vehicle ECU 30 and the electronic key 50 is executed, and further an area detection is executed (SS2). The area detection is continuously executed thereafter (SS3). When the electronic key 50 enters the third area 62, the vehicle ECU 30 detects that the electronic key 50 enters the third area 62 (SS4). Then, the vehicle ECU 30 transitions to a vehicle operation waiting state (SS5). The electronic key 50 is notified of the transition to a vehicle operation waiting state (SS6). When the electronic key 50 receives the notification of transition to a vehicle operation waiting state, the LED 52 blinks (SS7). After the vehicle ECU 30 transitions to the vehicle operation waiting state, the vehicle 20 can be controlled (a control enabled state) by an operation of the switch 41 of the vehicle 20 (SS8).

(Example (2) in which Notification of Transition to Vehicle Operation Waiting State is not Stopped)

Figure 8:
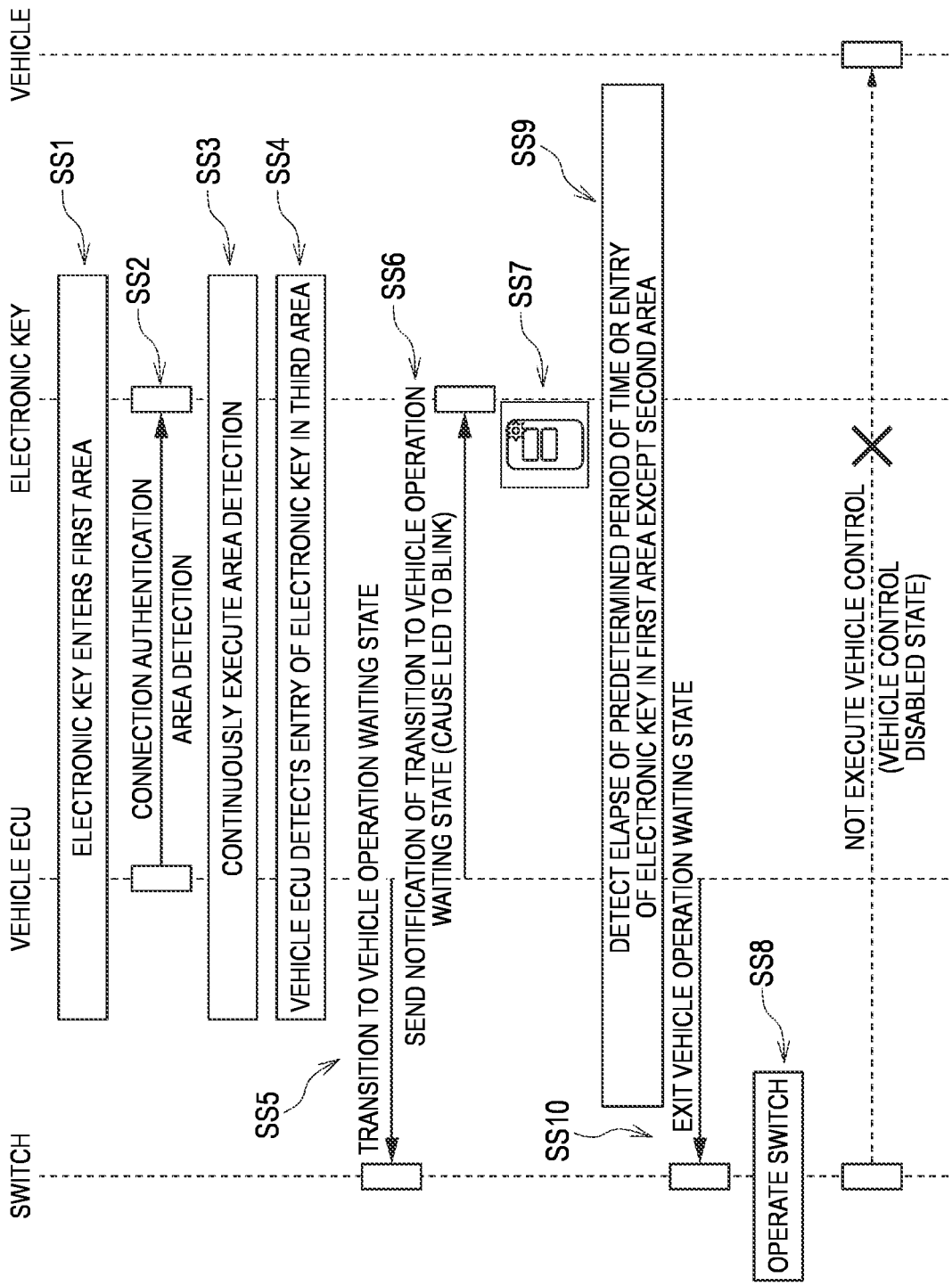
FIG. 8 is a sequence diagram showing a processing executed between the vehicle ECU and the electronic key when a notification of transition to a vehicle operation waiting state is not stopped in the vehicle control system according to the first embodiment.

FIG. 8 is a sequence diagram showing a processing executed between the vehicle ECU 30 and the electronic key 50 when a notification of transition to a vehicle operation waiting state is not stopped in the vehicle control system 10 according to the first embodiment. The same reference numerals are given to processings the same as those in FIG. 7.

In FIG. 8, when the electronic key 50 enters the first area 60 (SS1), connection authentication between the vehicle ECU 30 and the electronic key 50 is executed, and further an area detection is executed (SS2). The area detection is continuously executed thereafter (SS3). When the electronic key 50 enters the third area 62, the vehicle ECU 30 detects that the electronic key 50 enters the third area 62 (SS4). Then, the vehicle ECU 30 transitions to a vehicle operation waiting state (SS5). The electronic key 50 is notified of the transition to a vehicle operation waiting state (SS6). When the electronic key 50 receives the notification of transition to a vehicle operation waiting state, the LED 52 blinks (SS7). Thereafter, when it is detected that a predetermined period of time is elapsed from a time point when the electronic key 50 enters the third area 62, or when it is detected that the electronic key 50 enters the first area 60 excluding the second area 61 (SS9), the vehicle ECU 30 does not enter the vehicle operation waiting state (SS10). As a result, even when the switch 41 of the vehicle 20 is operated (SS8), the vehicle 20 is not controlled (vehicle control disabled state).

Figure 9:
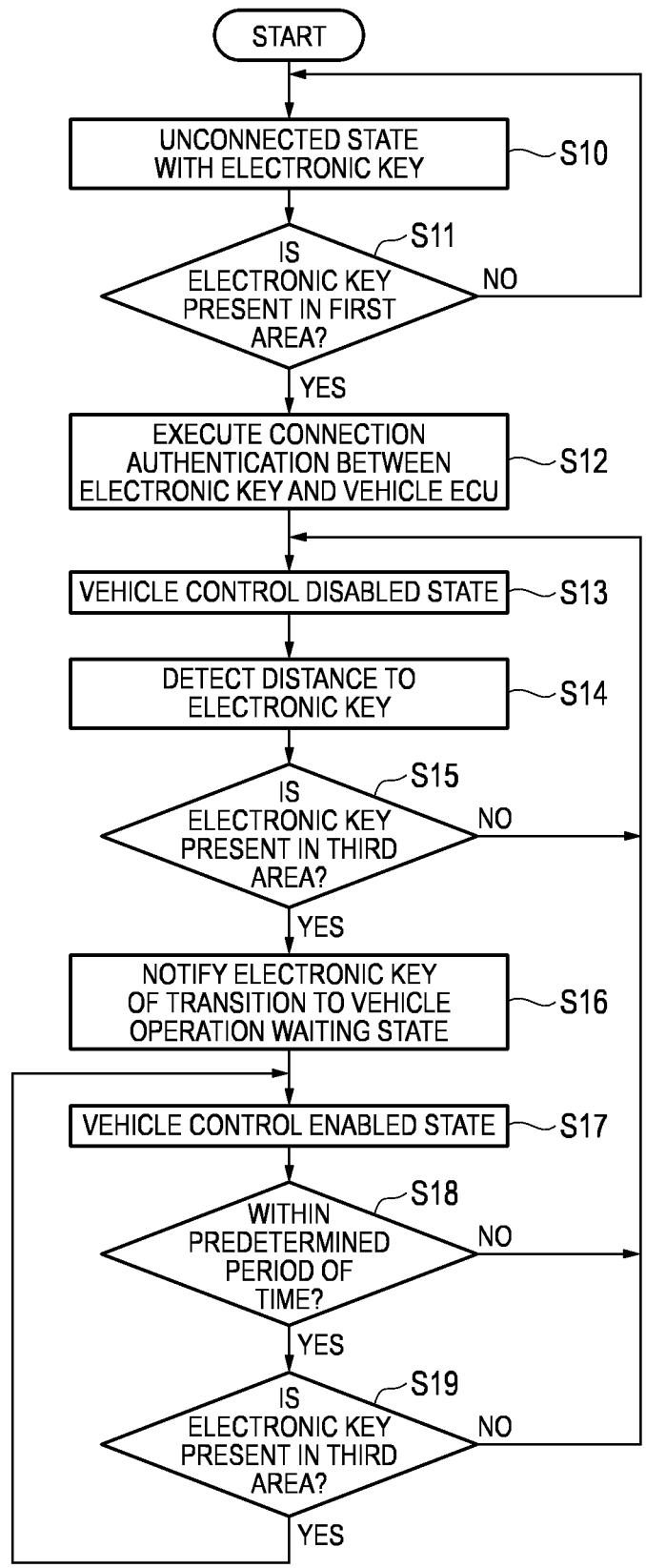
FIG. 9 is a flowchart showing an operation of the vehicle ECU of the vehicle control system according to the first embodiment.

FIG. 9 is a flowchart showing an operation of the vehicle ECU 30 of the vehicle control system 10 according to the first embodiment. FIG. 9 is a flowchart showing the example (2) in which the notification of transition to a vehicle operation waiting state is not stopped in FIG. 8. In FIG. 9, the vehicle ECU 30 confirms that the vehicle ECU 30 is not connected with the electronic key 50 (step S10), and then determines whether the electronic key 50 is present in the first area 60 (step S11). When it is determined that the electronic key 50 is not present in the first area 60 ("NO" in step S11), the processings in steps S10 and S11 are repeated until it is determined that the electronic key 50 is present in the first area 60. On the other hand, when it is determined that the electronic key 50 is present in the first area 60 ("YES" in step S11), connection authentication between the electronic key 50 and the vehicle ECU 30 is executed (step S12). After the connection authentication between the vehicle ECU 30 and the electronic key 50 is executed, the vehicle ECU 30 confirms that the vehicle ECU 30 is in a control disabled state (step S13), and then detects a distance to the electronic key 50 (step S14). The distance to the electronic key 50 is measured according to a method using RSSI, TOF, phase information of radio waves, or the like.

After the distance to the electronic key 50 is detected, the vehicle ECU 30 determines whether the electronic key 50 is present in the third area 62 (step S15). When it is determined that the electronic key 50 is not present in the third area 62 ("NO" in step S15), the processings in steps S13 to S15 are repeated until it is determined that the electronic key 50 is present in the third area 62. On the other hand, when it is determined that the electronic key 50 is present in the third area 62 ("YES" in step S15), the vehicle ECU 30 notifies the electronic key 50 of the transition to a vehicle operation waiting state (step S16), and thereafter, the vehicle ECU 30 enters a vehicle control enabled state (step S17).

Next, the vehicle ECU 30 determines whether an elapsed time from when the electronic key 50 enters the third area 62 is within a predetermined period of time (step S18). When it is determined that the elapsed time is not within the predetermined period of time ("NO" in step S18), the processing returns to step S13, and the vehicle ECU 30 enters a vehicle control disabled state. On the other hand, when it is determined that the elapsed time from when the electronic key 50 enters the third area 62 is within the predetermined period of time ("YES" in step S18), then, the vehicle ECU 30 determines whether the electronic key 50 is present in the third area 62 (step S19). When it is determined that the electronic key 50 is not present in the third area 62 ("NO" in step S19), the processing returns to step S13, and the vehicle ECU 30 enters a vehicle control disabled state. On the other hand, when it is determined that the electronic key 50 is present in the third area 62 ("YES" in step S19), the processing returns to step S17, and the vehicle control enabled state is continued.

Figure 10:
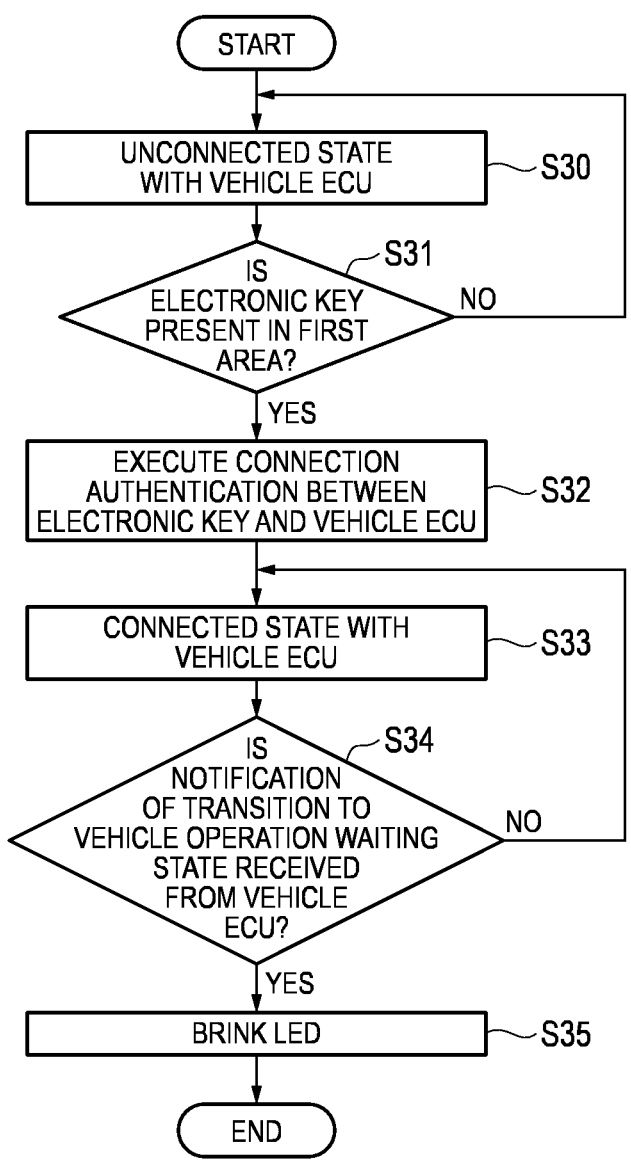
FIG. 10 is a flowchart showing an operation of the electronic key of the vehicle control system according to the first embodiment.

FIG. 10 is a flowchart showing an operation of the electronic key 50 of the vehicle control system 10 according to the first embodiment. FIG. 10 is a flowchart showing the example (2) in which the notification of transition to a vehicle operation waiting state is not stopped in FIG. 8. In FIG. 10, the electronic key 50 confirms that the electronic key 50 is not connected with the vehicle ECU 30 (step S30), and then determines whether the electronic key 50 is present in the first area 60 (step S31). When it is determined that the electronic key 50 is not present in the first area 60 ("NO" in step S31), the processings in steps S30 and S31 are repeated until it is determined that the electronic key 50 is present in the first area 60. On the other hand, when it is determined that the electronic key 50 is present in the first area 60 ("YES" in step S31), connection authentication between the electronic key 50 and the vehicle ECU 30 is executed (step S32). After the connection authentication between the electronic key 50 and the vehicle ECU 30 is executed, the electronic key 50 confirms that the electronic key 50 is connected with the vehicle ECU 30 (step S33). Next, the electronic key 50 determines whether the electronic key 50 receives a notification of transition to a vehicle operation waiting state from the vehicle ECU 30 (step S34). When it is determined that the electronic key 50 does not receive the notification of transition to a vehicle operation waiting state ("NO" in step S34), the processing returns to step S33. On the other hand, when it is determined that the electronic key 50 receives the notification of transition to a vehicle operation waiting state ("YES" in step S34), the LED 52 blinks (step S35).

Next, an operation of an example in which a notification is stopped in the vehicle control system 10 according to the first embodiment will be described in detail.

(Example (1) in which Notification of Transition to Vehicle Operation Waiting State is Stopped)

Figure 11:
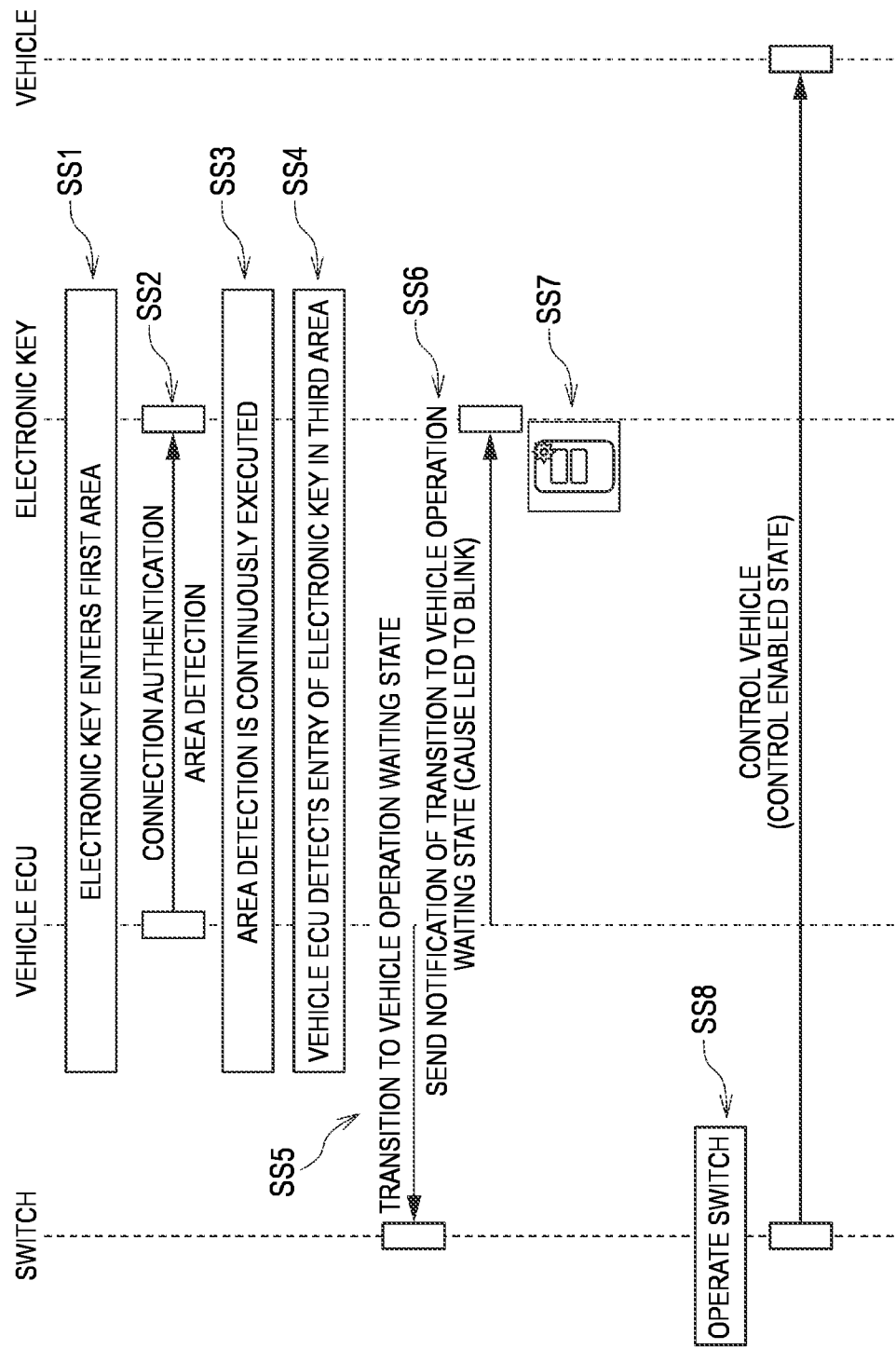
FIG. 11 is a sequence diagram showing a processing executed between the vehicle ECU and the electronic key when a notification of transition to a vehicle operation waiting state is stopped in the vehicle control system according to the first embodiment.

FIG. 11 is a sequence diagram showing a processing executed between the vehicle ECU 30 and the electronic key 50 when the notification of transition to a vehicle operation waiting state is stopped in the vehicle control system 10 according to the first embodiment. The same reference numerals are given to processings the same as those in FIG. 7.

In FIG. 11, when the electronic key 50 enters the first area 60 (SS1), connection authentication between the vehicle ECU 30 and the electronic key 50 is executed, and further an area detection is executed (SS2). The area detection is continuously executed thereafter (SS3). Thereafter, when the vehicle ECU 30 detects that the electronic key 50 enters the third area 62 (SS4), the vehicle ECU 30 transitions to a vehicle operation waiting state (SS5). When the vehicle ECU 30 transitions to the vehicle operation waiting state, the vehicle ECU 30 notifies the electronic key 50 of the transition to the vehicle operation waiting state (SS6). When the electronic key 50 receives the notification of transition to a vehicle operation waiting state from the vehicle ECU 30, the LED 52 blinks (SS7). Thereafter, the switch 41 of the vehicle 20 is operated (SS8) to control the vehicle 20 (a control enabled state).

(Example (2) in which Notification of Transition to Vehicle Operation Waiting State is Stopped)

Figure 12:
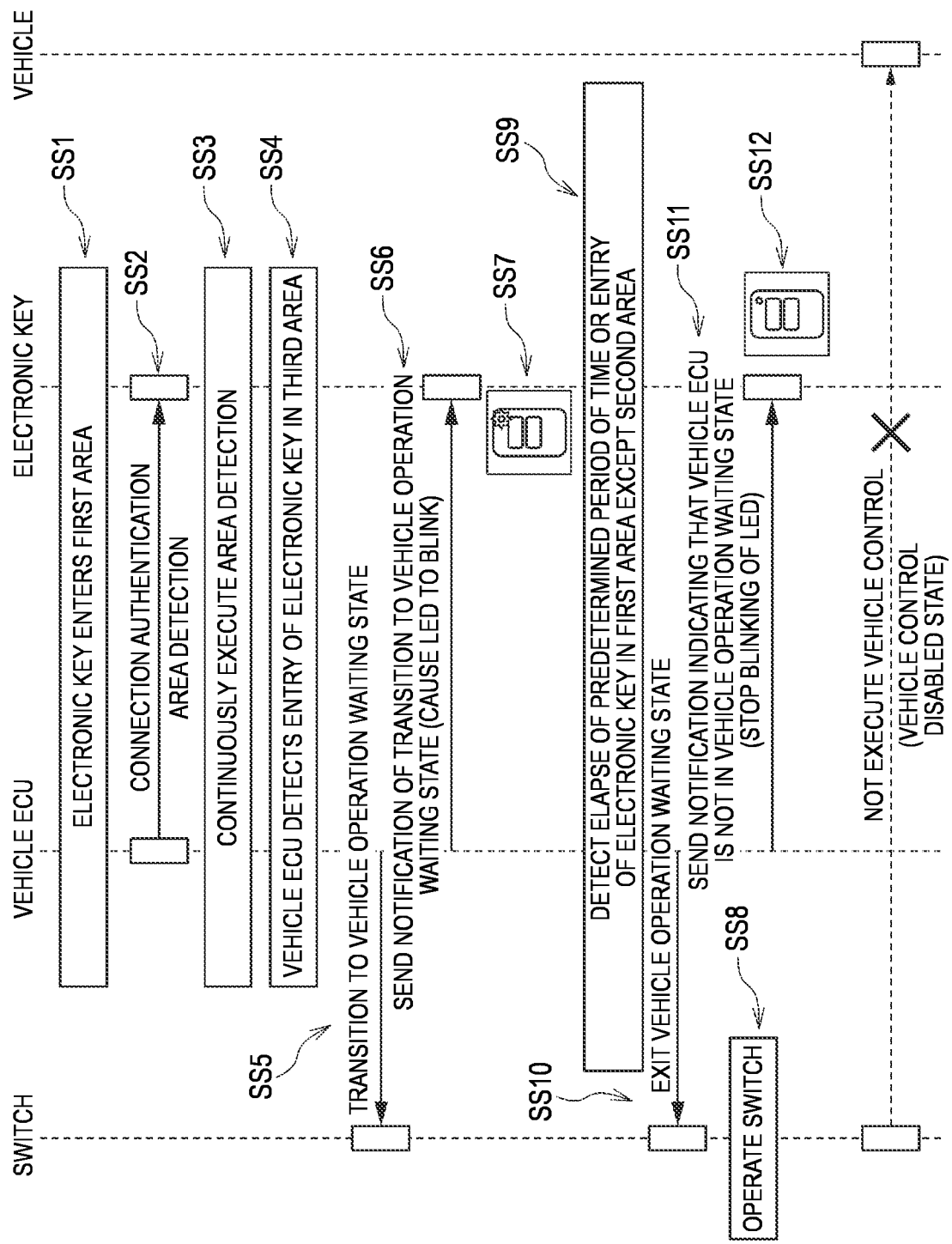
FIG. 12 is a sequence diagram showing a processing executed between the vehicle ECU and the electronic key when a notification of transition to a vehicle operation waiting state is stopped in the vehicle control system according to the first embodiment.

FIG. 12 is a sequence diagram showing a processing executed between the vehicle ECU 30 and the electronic key 50 when the notification of transition to a vehicle operation waiting state is stopped in the vehicle control system 10 according to the first embodiment. The same reference numerals are given to processings the same as those in FIG. 7.

In FIG. 12, when the electronic key 50 enters the first area 60 (SS1), connection authentication between the vehicle ECU 30 and the electronic key 50 is executed, and further an area detection is executed (SS2). The area detection is continuously executed thereafter (SS3). Thereafter, when the vehicle ECU 30 detects that the electronic key 50 enters the third area 62 (SS4), the vehicle ECU 30 transitions to a vehicle operation waiting state (SS5). When the vehicle ECU 30 transitions to a vehicle operation waiting state, the vehicle ECU 30 notifies the electronic key 50 of the transition to a vehicle operation waiting state (SS6). When the electronic key 50 receives the notification of transition to a vehicle operation waiting state, the LED 52 blinks (SS7). Thereafter, when it is detected that a predetermined period of time is elapsed from a time point when the electronic key 50 enters the third area 62, or when it is detected that the electronic key 50 enters the first area 60 excluding the second area 61 (SS9), it is determined that the vehicle ECU 30 does not enter the vehicle operation waiting state (SS10). The vehicle ECU 30 notifies the electronic key 50 that the vehicle ECU does not enter the vehicle operation waiting state (SS11). When the electronic key 50 receives a notification indicating that the vehicle ECU 30 does not enter the vehicle operation waiting state from the vehicle ECU 30, the electronic key 50 stops blinking of the LED 52 (SS12). Even when the switch 41 of the vehicle 20 is operated (SS8), the vehicle ECU 30 does not execute vehicle control (enters a control disabled state).

Figure 13:
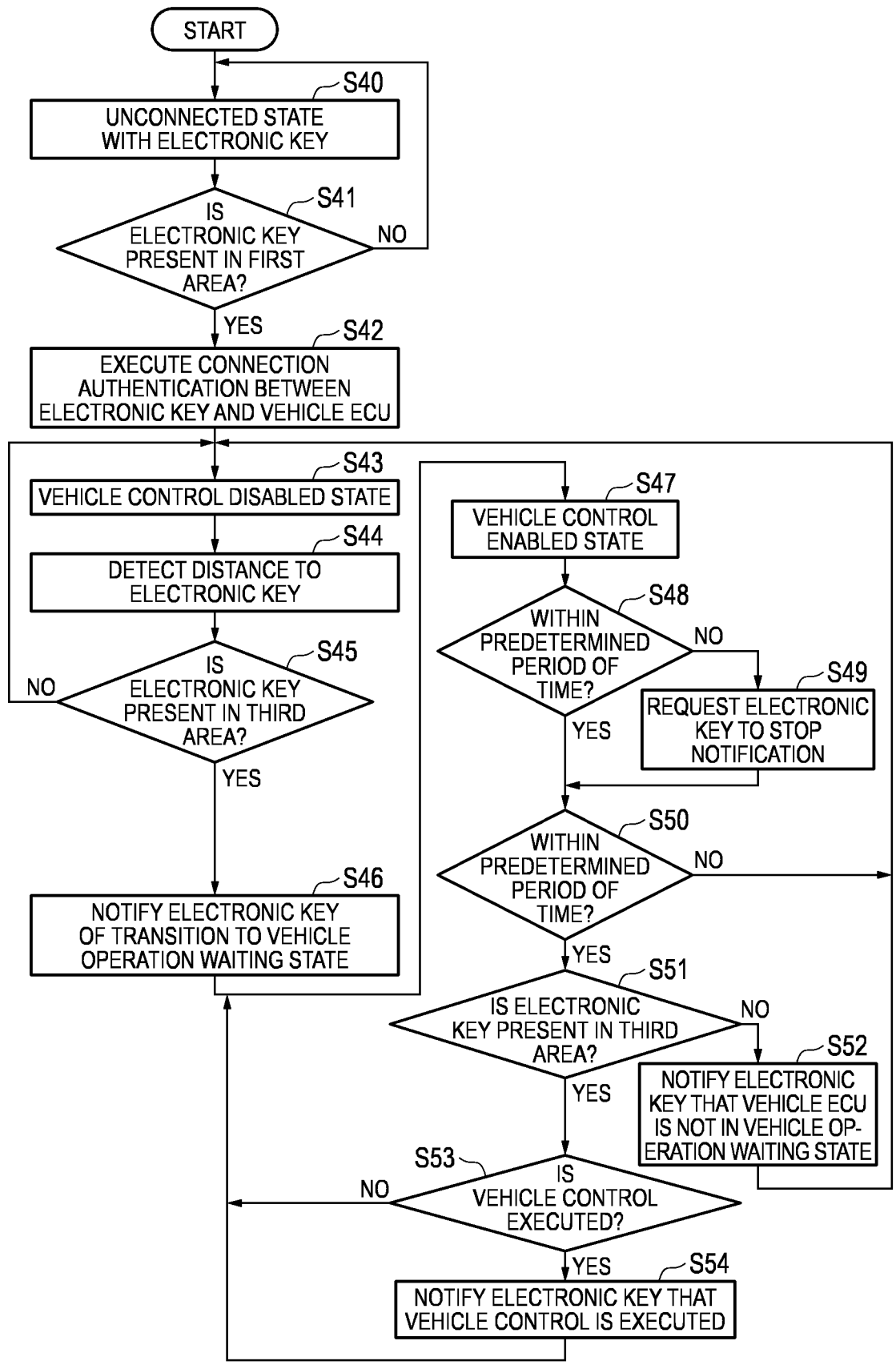
FIG. 13 is a flowchart showing an operation of the vehicle ECU of the vehicle control system according to the first embodiment.

FIG. 13 is a flowchart showing an operation of the vehicle ECU 30 of the vehicle control system 10 according to the first embodiment. FIG. 13 is a flowchart showing the example (2) in which the notification of transition to a vehicle operation waiting state is stopped in FIG. 12. In FIG. 13, the vehicle ECU 30 confirms that the vehicle ECU 30 is not connected with the electronic key 50 (step S40), and then determines whether the electronic key 50 is present in the first area 60 (step S41). When it is determined that the electronic key 50 is not present in the first area 60 ("NO" in step S41), the processings in steps S40 and S41 are repeated until it is determined that the electronic key 50 is present in the first area 60. When it is determined that the electronic key 50 is present in the first area 60 ("YES" in step S41), the vehicle ECU 30 executes connection authentication between the electronic key 50 and the vehicle ECU 30 (step S42). After the connection authentication is executed, the vehicle ECU 30 confirms that the vehicle ECU is in a vehicle control disabled state (step S43), and then detects a distance to the electronic key 50 (step S44). The distance to the electronic key 50 is measured according to a method using RSSI, TOF, phase information of radio waves, or the like.

After the distance to the electronic key 50 is detected, the vehicle ECU 30 determines whether the electronic key 50 is present in the third area 62 (step S45). When it is determined that the electronic key 50 is not present in the third area 62 ("NO" in step S45), the processings in steps S43 to S45 are repeated until it is determined that the electronic key 50 is present in the third area 62. When it is determined that the electronic key 50 is present in the third area 62 ("YES" in step S45), the vehicle ECU 30 notifies the electronic key 50 of the transition to the vehicle operation waiting state (step S46), and thereafter, the vehicle ECU 30 enters a vehicle control enabled state (step S47).

Next, the vehicle ECU 30 determines whether an elapsed time from when the electronic key 50 enters the third area 62 is within a predetermined period of time (step S48). When it is determined that the elapsed time is not within the predetermined period of time ("NO" in step S48), the vehicle ECU 30 requests to stop the notification to the electronic key 50 (step S49). When the vehicle ECU 30 determines that the elapsed time from when the electronic key 50 enters the third area 62 is within the predetermined period of time ("YES" in step S48) or when the vehicle ECU 30 requests to stop the notification to the electronic key 50, the vehicle ECU 30 determines again whether the elapsed time is within the predetermined time (step S50). When it is determined that the elapsed time is not within the predetermined period of time ("NO" in step S50), the processing returns to step S43 and the vehicle ECU 30 enters a vehicle control disabled state. On the other hand, when it is determined that the elapsed time is within the predetermined period of time ("YES" in step S50), the vehicle ECU 30 determines whether the electronic key 50 is present in the third area 62 (step S51). When it is determined that the electronic key 50 is not present in the third area 62 ("NO" in step S51), that is, when the electronic key 50 exits the third area 62, the vehicle ECU 30 notifies the electronic key 50 that the vehicle ECU 30 is not in the vehicle operation waiting state (step S52), and the processing returns to step S43.

When it is determined that the electronic key 50 is present in the third area 62 ("YES" in step S51), the vehicle ECU 30 determines whether vehicle control is executed (step S53). When it is determined that no vehicle control is executed ("NO" in step S53), the processing returns to step S47. On the other hand, when it is determined that the vehicle control is executed ("YES" in step S53), the vehicle ECU 30 notifies the electronic key 50 that the vehicle control is executed (step S54). That is, the electronic key 50 is notified that the vehicle control is executed. Thereafter, the processing returns to step S47.

Figure 14:
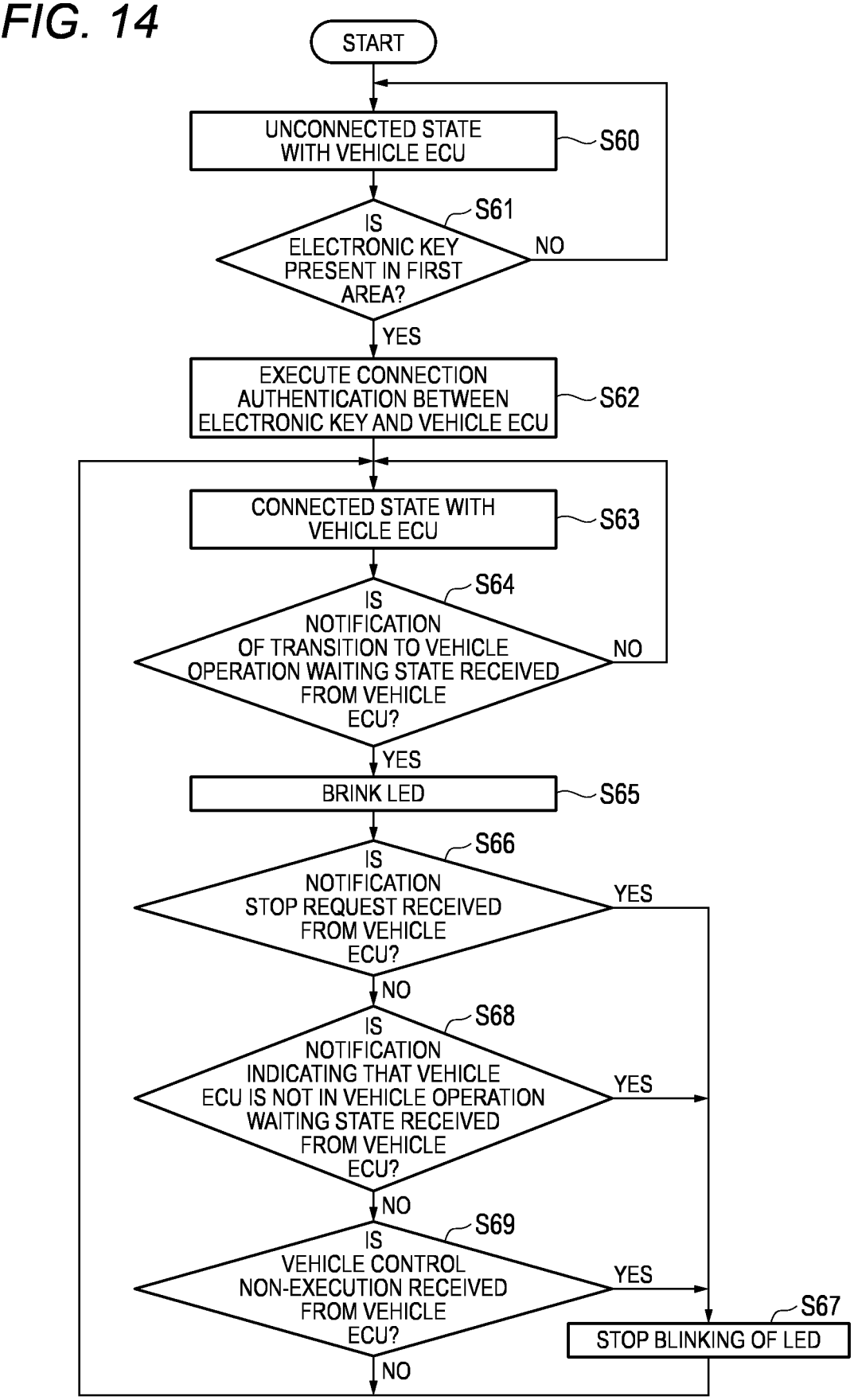
FIG. 14 is a flowchart showing an operation of the electronic key of the vehicle control system according to the first embodiment.

FIG. 14 is a flowchart showing an operation of the electronic key 50 of the vehicle control system 10 according to the first embodiment. FIG. 14 is a flowchart showing the example (2) in which the notification of transition to a vehicle operation waiting state is stopped in FIG. 12. In FIG. 14, the electronic key 50 confirms that the electronic key 50 is not connected with the vehicle ECU 30 (step S60), and then determines whether the electronic key 50 is present in the first area 60 (step S61). When it is determined that the electronic key 50 is not present in the first area 60 ("NO" in step S61), the processings in steps S60 and S61 are repeated until it is determined that the electronic key 50 is present in the first area 60. On the other hand, when it is determined that the electronic key 50 is present in the first area 60 ("YES" in step S61), connection authentication between the electronic key 50 and the vehicle ECU 30 is executed (step S62). After the connection authentication between the electronic key 50 and the vehicle ECU 30 is executed, the electronic key 50 confirms that the electronic key 50 is connected with the vehicle ECU 30 (step S63). Then, the electronic key 50 determines whether the electronic key 50 receives a notification of transition to a vehicle operation waiting state from the vehicle ECU 30 (step S64). When it is determined that the electronic key 50 does not receive the notification of transition to a vehicle operation waiting state ("NO" in step S64), the processing returns to step S63. On the other hand, when it is determined that the electronic key 50 receives the notification of transition to a vehicle operation waiting state ("YES" in step S64), the LED 52 blinks (step S65).

The electronic key 50 determines that the notification of transition to a vehicle operation waiting state is received and causes the LED 52 to blink, and thereafter determines whether a notification stop request is received from the vehicle ECU 30 (step S66). When it is determined that the electronic key 50 receives the notification stop request from the vehicle ECU 30 ("YES" in step S66), the electronic key 50 stops blinking of the LED 52 (step S67). On the other hand, when it is determined that the electronic key 50 does not receive the notification stop request from the vehicle ECU 30 ("NO" in step S66), the electronic key 50 determines whether a notification indicating that the vehicle ECU is not in a vehicle operation waiting state is received from the vehicle ECU 30 (step S68). When it is determined that the electronic key 50 receives the notification indicating that the vehicle ECU 30 is not in a vehicle operation waiting state from the vehicle ECU 30 ("YES" in step S68), the electronic key 50 stops blinking of the LED 52 (step S67). On the other hand, when it is determined that the electronic key 50 does not receive the notification indicating that the vehicle ECU 30 is not in a vehicle operation waiting state from the vehicle ECU 30 ("NO" in step S68), the electronic key 50 determines whether vehicle control non-execution is received from the vehicle ECU 30 (step S69). When it is determined that the electronic key 50 does not receive the vehicle control non-execution from the vehicle ECU 30 ("NO" in step S69), the electronic key 50 returns the processing to step S63 without stopping blinking of the LED 52.

As described above, the vehicle control system 10 according to the first embodiment includes the first area 60 including the vehicle 20, the second area 61 including the vehicle 20 and smaller than the first area 60, and the third area 62 including the vehicle 20 and smaller than the second area 61. When the electronic key 50 enters the first area 60, the electronic key 50 and the vehicle ECU 30 are wirelessly connected and connection authentication is executed. When the electronic key 50 enters the third area 62 from the first area 60 after connection authentication is executed, the vehicle ECU 30 enters an operation waiting state in which the vehicle ECU 30 can receive an operation of the vehicle operation device 40. When the vehicle ECU 30 is in an operation waiting state and the vehicle operation device 40 receives a predetermined operation, the vehicle 20 enters a control enabled state. Therefore, a period of time from when the vehicle operation device 40 receives the predetermined operation to when the vehicle 20 enters a control enabled state can be shortened. That is, since the connection authentication between the electronic key 50 and the vehicle ECU 30 is executed before the vehicle operation device 40 receives the predetermined operation, it is possible to shorten the period of time from when the vehicle operation device 40 receives the predetermined operation to when the vehicle 20 enters the control enabled state.

Since there is hysteresis in which, after the electronic key 50 enters the third area 62, the vehicle ECU 30 continues to be in an operation waiting state even when the electronic key 50 enters the second area 61 excluding the third area 62, the vehicle 20 can be maintained in a control enabled state even when a manner of carrying the electronic key 50 is changed.

During a period in which the electronic key 50 enters the third area 62 or the second area 61 excluding the third area 62, when an elapsed time from when the electronic key 50 enters the third area 62 from the outside of the third area 62 is larger than a predetermined period of time, the vehicle 20 does not enter an operation waiting state. Therefore, security can be ensured.

When the electronic key 50 enters the first area 60 excluding the second area 61, the vehicle ECU 30 does not enter an operation waiting state. Therefore, a controllable area can be narrowed and security can be ensured.

In the vehicle control system 10 according to the first embodiment, the electronic key 50 is provided with the LED 52 and can display information indicating that the vehicle 20 is in an operation waiting state. Alternatively, the electronic key 50 may display a predetermined image indicating that the vehicle 20 is in an operation waiting state by using a display capable of displaying an image. In addition to display a predetermined image indicating that the vehicle 20 is in an operation waiting state, the following methods may be used.

- The electronic key 50 is provided with a vibrator (not shown) configured to generate the notification indicating that the vehicle 20 is in an operation waiting state using vibration.
- The electronic key 50 is provided with a speaker (not shown) configured to generate the notification indicating that the vehicle 20 is in an operation waiting state using a sound.
- The electronic key 50 is provided with a buzzer (not shown) configured to generate the notification indicating that the vehicle 20 is in an operation waiting state using a beep sound.

In the vehicle control system 10 according to the first embodiment, the vehicle ECU 30 and the electronic key 50 are combined. Alternatively, the vehicle ECU 30 may be combined with a smartphone instead of the electronic key 50. Since a smartphone includes some or all of a display capable of displaying a predetermined image, a vibrator, a speaker, a buzzer, and the like in addition to an LED, it is possible to easily notify the user that the vehicle 20 is in an operation waiting state.

Figure 15:
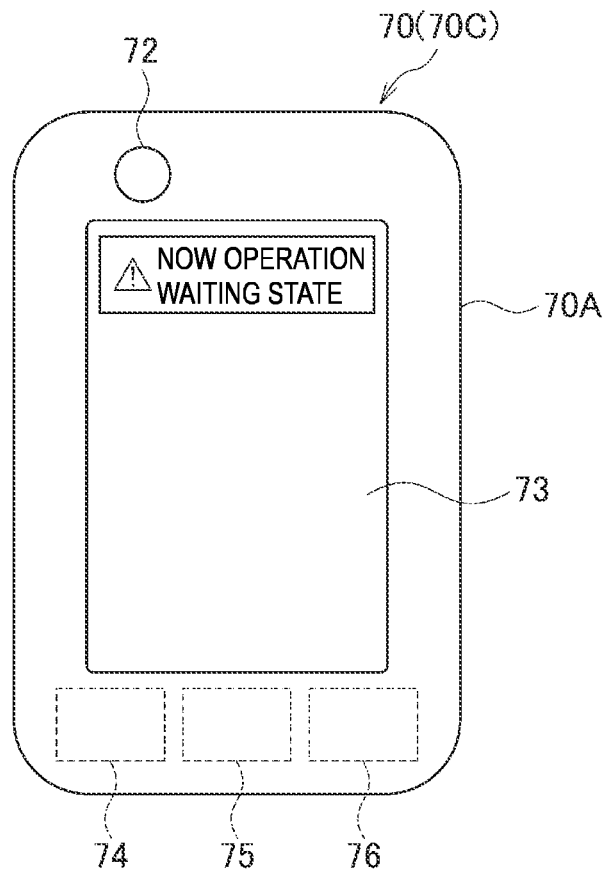
FIG. 15 is a plan view showing an external appearance of a smartphone applicable to the vehicle control system according to the first embodiment.
Figure 16:
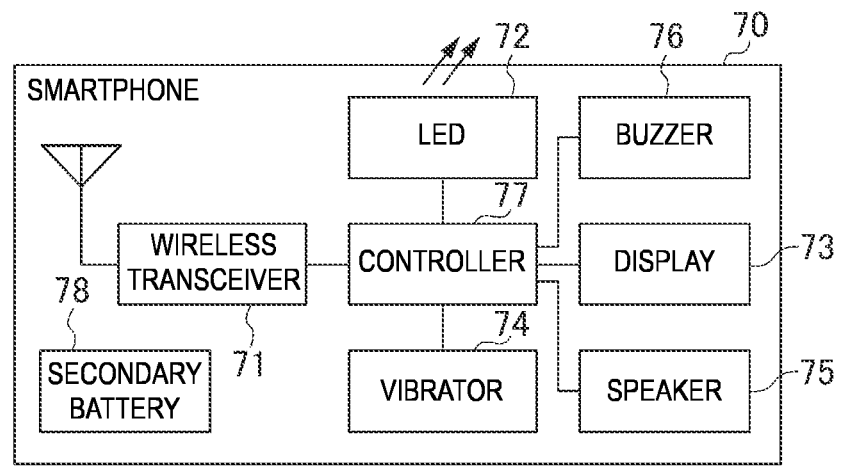
FIG. 16 is a block diagram showing a schematic configuration of the smartphone in FIG. 15.

FIG. 15 is a plan view showing an external appearance of a smartphone 70. FIG. 16 is a block diagram showing a schematic configuration of the smartphone 70 in FIG. 15. In FIGS. 15 and 16, the smartphone 70 has a rectangular housing (second housing) 70A, an LED 72 is disposed at an upper left side of a front face side of the housing 70A, and a display 73 is disposed below the LED 72. A vibrator 74, a speaker 75, and a buzzer 76 are built in a lower portion of the housing 70A. A wireless transceiver 71, a controller 77, and a secondary battery 78 are built in the housing 70A. The wireless transceiver 71 executes wireless communication complying with Bluetooth™ between the wireless transceiver 71 and the vehicle ECU 30 or between the wireless transceiver 71 and the electronic key 50. The display 73 is a display such as a liquid crystal display (LCD) and an organic electro luminescence (EL), and displays a dynamic image or a still image. The vibrator 74 generates vibration. The speaker 75 outputs a sound. The buzzer 76 generates a beep sound. The secondary battery 78 is a rechargeable battery such as a nickel-cadmium battery and a lithium battery. The controller 77 includes a CPU, a ROM, a RAM, an interface, and the like, and controls the parts described above (the wireless transceiver 71, the LED 72, the display 73, the vibrator 74, the speaker 75, and the buzzer 76). When the vehicle 20 is in an operation waiting state, the controller 77 controls the LED 72 to blink, or controls the display device 73 to display a predetermined image indicating that the vehicle 20 is in an operation waiting state, or controls the vibrator 74 to vibrate, or controls the speaker 75 to output a sound indicating that the vehicle 20 is in an operation waiting state, or controls the buzzer 76 to generate a beep sound. Alternatively, a notification may be made by combing these methods.

In the vehicle control system 10 according to the first embodiment, a measurement of a distance between the vehicle ECU 30 and the electronic key 50 is executed at the vehicle ECU 30 side. Alternatively, the measurement may be executed at the electronic key 50 side, or may be executed at both the vehicle ECU 30 side and the electronic key 50 side.

Figure 17:
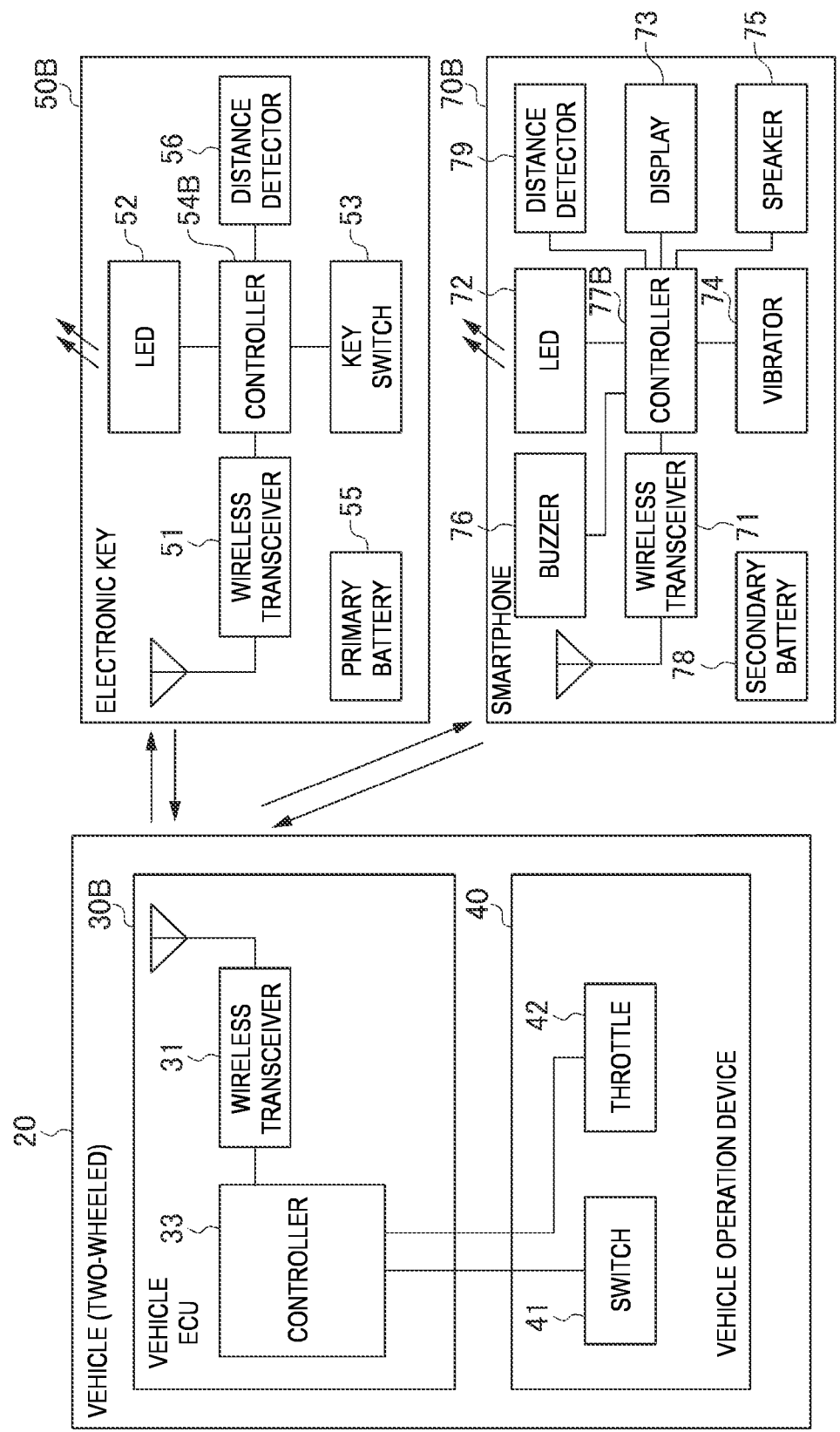
FIG. 17 is a block diagram showing a schematic configuration of a vehicle ECU that does not have a distance detection function and a schematic configuration of an electronic key and a smartphone each having a distance detection function, which are applicable to the vehicle control system according to the first embodiment.

FIG. 17 is a block diagram showing a schematic configuration of a vehicle ECU 30B that does not have a distance detection function, and a schematic configuration of an electronic key 50B and a smartphone 70B each having a distance detection function. As shown in FIG. 17, the vehicle ECU 30B does not have a distance detection function, and each of the electronic key 50B and the smartphone 70B has a distance detection function. That is, the electronic key 50B includes a distance detector 56, and the smartphone 70B includes a distance detector 79. Since the electronic key 50B includes the distance detector 56 and a control content of the electronic key 50B is partially different from that of the electronic key 50 not provided with the distance detector 56, a controller is denoted by a reference numeral 54B. The same applies to the smartphone 70B, and a controller is denoted by a reference numeral 77B.

Figure 18:
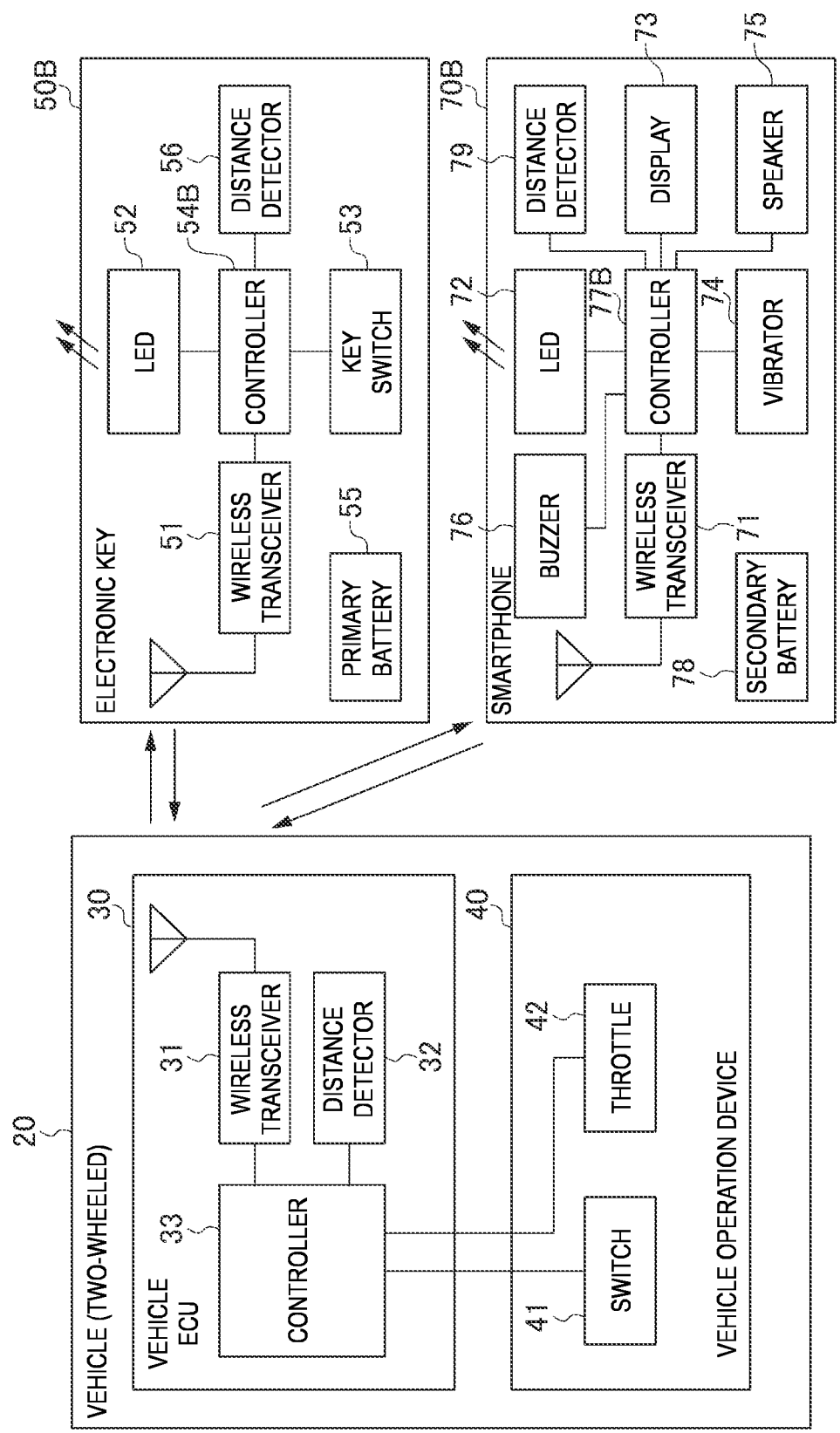
FIG. 18 is a block diagram showing a schematic configuration of a vehicle ECU, an electronic key, and a smartphone each having a distance detection function and that are applicable to the vehicle control system according to the first embodiment.

FIG. 18 is a block diagram showing a schematic configuration of the vehicle ECU 30, the electronic key 50B, and the smartphone 70B each having a distance detection function. As shown in FIG. 18, all of the vehicle ECU 30, the electronic key 50B, and the smartphone 70B have a distance detection function.

Wireless communication complying with Bluetooth™ is executed among the vehicle ECU 30, 30B, the electronic keys 50, 50B, and the smartphone 70, 70B.

Second Embodiment

Next, a vehicle control system according to a second embodiment will be described. Similar to the vehicle control system 10 according to the first embodiment described above, the vehicle control system according to the present embodiment can shorten a period of time up to when the vehicle 20 enters a control enabled state, and further can reliably notify a user that the vehicle 20 enters an operation waiting state. In the electronic key 50 provided with an LED only, a user can be notified that the vehicle 20 enters an operation waiting state mainly by blinking of the LED, but it cannot be said that the electronic key 50 can reliably notify the user that the vehicle 20 enters an operation waiting state. In the vehicle control system according to the present embodiment, the smartphone is used to notify the user that the vehicle 20 enters an operation waiting state. The smartphone includes various notification devices such as a display, a vibrator, a speaker, a buzzer, and an LED, and an amount of information that can be provided to a user is fairly large. A user can be reliably notified that the vehicle 20 enters an operation waiting state by using these notification devices. It is needless to say the electronic key 50 also makes a notification.

Figure 19:
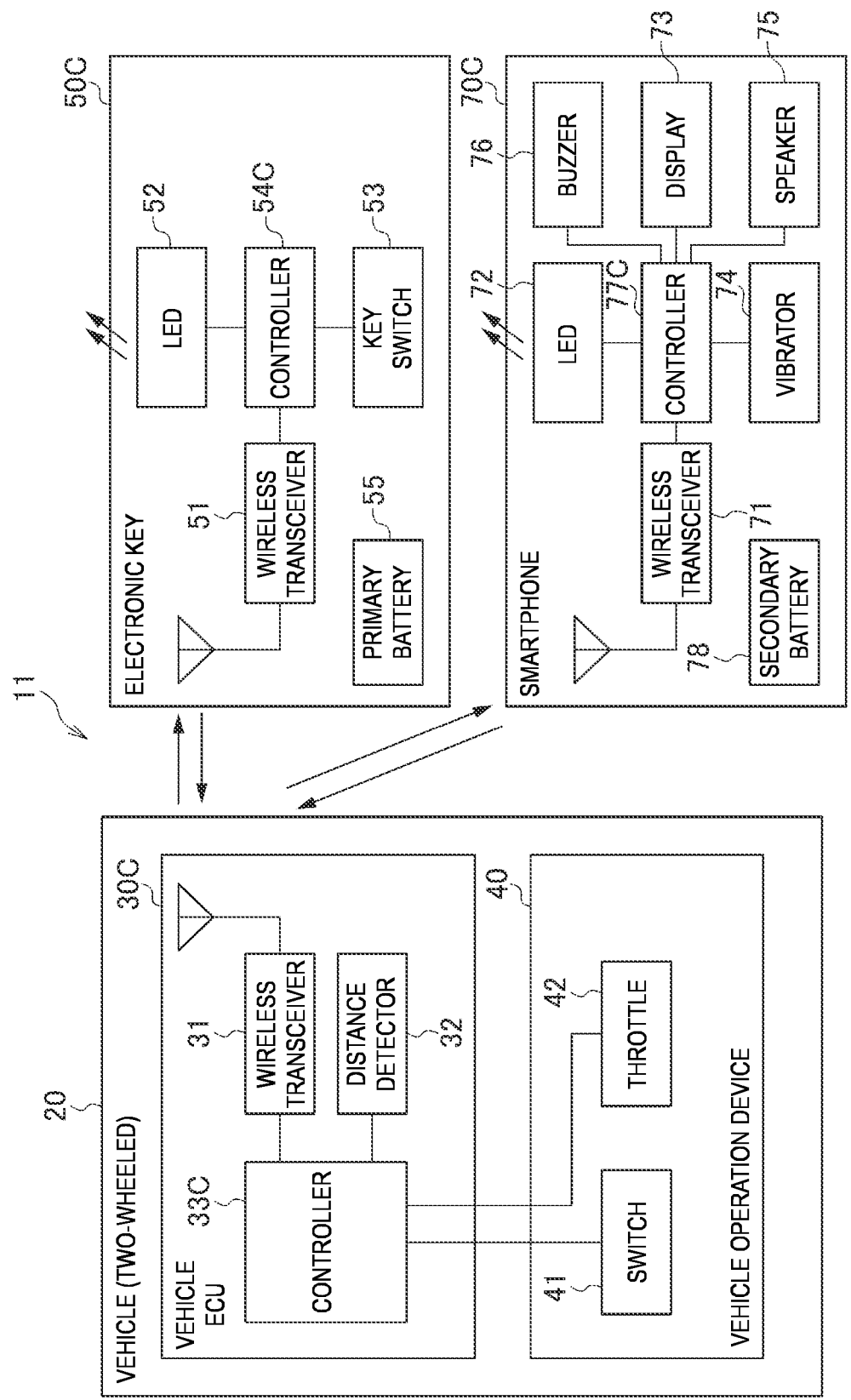
FIG. 19 is a block diagram showing a schematic configuration of a vehicle control system according to a second embodiment.

FIG. 19 is a block diagram showing a schematic configuration of a vehicle control system 11 according to the second embodiment. In FIG. 19, components the same as those of the vehicle control system 10 according to the first embodiment shown in FIG. 1 are denoted by the same reference numerals. In FIG. 19, the vehicle control system 11 according to the present embodiment is applied to the two-wheeled vehicle 20 similar to the vehicle control system 10 according to the first embodiment. The vehicle control system 11 includes a vehicle ECU 30C mounted in the vehicle 20, the vehicle operation device 40 provided in the vehicle 20, an electronic key (first communication device) 50C carried by a user of the vehicle 20, and a smartphone (second communication device) 70C carried by the user of the vehicle 20.

The vehicle ECU 30C includes the wireless transceiver 31 that executes wireless communication complying with Bluetooth™ between the vehicle ECU 30C and the electronic key 50 and between the vehicle ECU 30C and the smartphone 70C, the distance detector 32 that detects a distance to the electronic key 50C, and a controller 33C that acquires a switch signal when the switch 41 and the throttle 42 of the vehicle operation device 40 are operated and controls the wireless transceiver 31 and the distance detector 32. The distance detector 32 measures a distance to the electronic key 50C according to a method using RSSI, TOF, phase information of radio waves, or the like. Measurement of a distance between the vehicle ECU 30C the electronic key 50C may be executed at the electronic key 50C side instead of the vehicle ECU 30C side, or may be executed at both the vehicle ECU 30C side and the electronic key 50C side. In the vehicle control system 11 according to the present embodiment, the distance measurement is only executed at the vehicle ECU 30C side.

The controller 33C includes a CPU (not shown), a ROM that stores a program for controlling the CPU, and a RAM used for an operation of the CPU. The controller 33C receives switch signals output from the switch 41 and the throttle 42 of the vehicle operation device 40.

The electronic key 50C includes the wireless transceiver 51 that executes wireless communication complying with Bluetooth™ between the electronic key 50C and the vehicle ECU 30C, the LED (first display) 52 that displays information indicating that the vehicle 20 is in an operation waiting state, the key switch 53, a controller 54C that acquires a switch signal when the key switch 53 is operated and controls the wireless transceiver 51 and the LED 52, and the primary battery 55 that supplies power to each part of the electronic key 50C. The controller 54C includes a CPU (not shown), a ROM that stores a program for controlling the CPU, and a RAM used for an operation of the CPU.

The smartphone 70C includes a wireless transceiver 71 that executes wireless communication complying with Bluetooth™ between the smartphone 70C and the vehicle ECU 30C, an LED 72 that displays information indicating that the vehicle 20 is in an operation waiting state, the display (second display) 73, the vibrator 74, the speaker 75, and the buzzer 76, a controller 77C that controls each component such as the wireless transceiver 71 and the LED 72, and a secondary battery 78 that supplies power to each part of the smartphone 70C. The controller 77C includes a CPU (not shown), a ROM that stores a program for controlling the CPU, and a RAM used for an operation of the CPU.

Similar to the vehicle control system 10 according to the first embodiment, the vehicle control system 11 according to the present embodiment can shorten a period of time from when the switch 41 of the vehicle 20 is operated to when the vehicle 20 enters a control enabled state. In the vehicle control system 11 according to the present embodiment, a vehicle controllable area for the vehicle 20 is provided to enable vehicle control by operating the switch 41 of the vehicle operation device 40.

Figure 20:
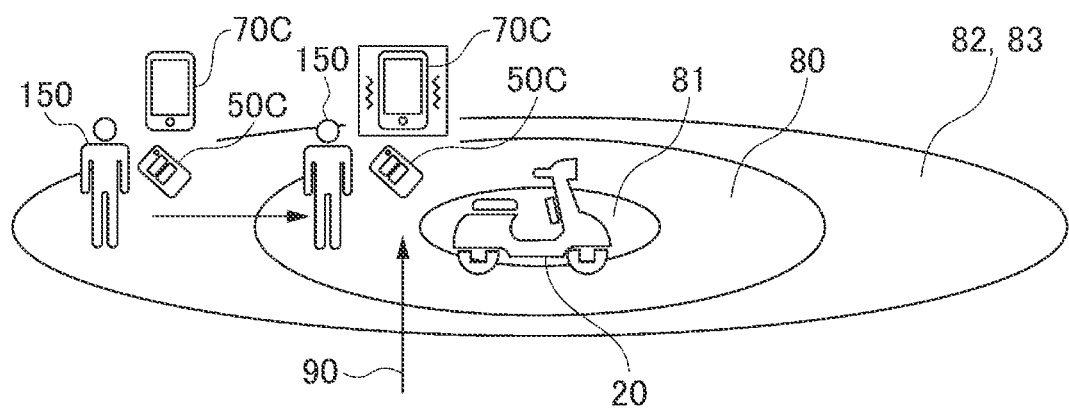
FIG. 20 is a diagram showing a vehicle controllable area provided in the vehicle control system according to the second embodiment.

FIG. 20 is a diagram showing a vehicle controllable area provided in the vehicle control system 11 according to the present embodiment. As shown in FIG. 20, the vehicle control system 11 according to the present embodiment includes, as vehicle controllable areas, a first area 80 including the vehicle 20, a second area 81 included in the first area 80 and smaller than the first area 80, a third area 82 including the first area 80 and larger than the first area 80, and a fourth area 83 including the first area 80 and larger than the first area 80. In the vehicle control system 11 according to the present embodiment, the third area 82 is identical with the fourth area 83.

When the electronic key 50C enters the third area 82, a wireless connection between the electronic key 50C and the vehicle ECU 30C is subject to connection authentication. When the electronic key 50C does not enter the third area 82, the wireless connection between the electronic key 50C and the vehicle ECU 30C is not subject to connection authentication. On the other hand, when the smartphone 70C enters the fourth area 83, a wireless connection between the smartphone 70C and the vehicle ECU 30C is subject to connection authentication. When the smartphone 70C does not enter the fourth area 83, the wireless connection between the smartphone 70C and the vehicle ECU 30C is not subject to connection authentication.

Figure 21A:
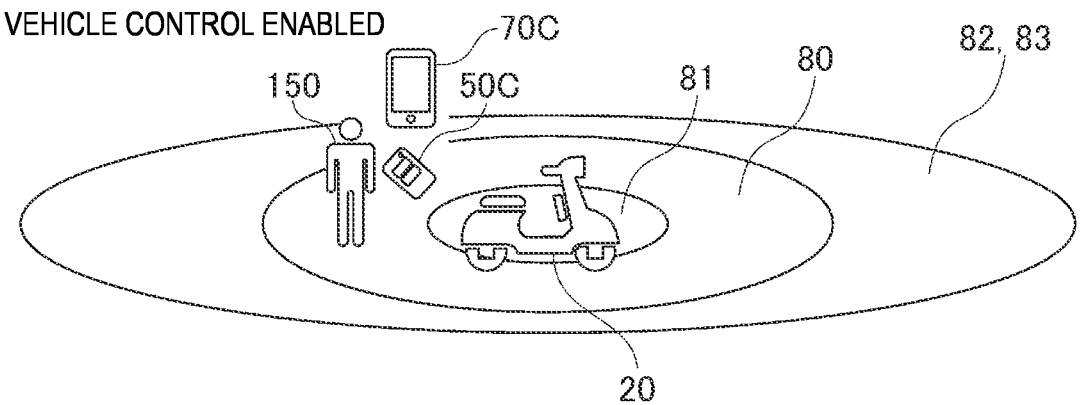
FIGS. 21A-21C are diagrams showing a case where a vehicle can be controlled and a case where the vehicle cannot be controlled in the vehicle control system according to the second embodiment.
Figure 21B:
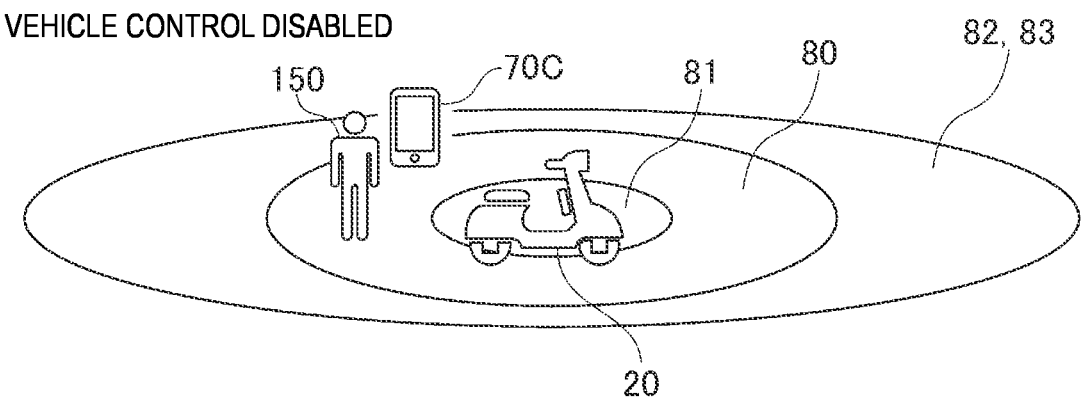
Figure 21C:
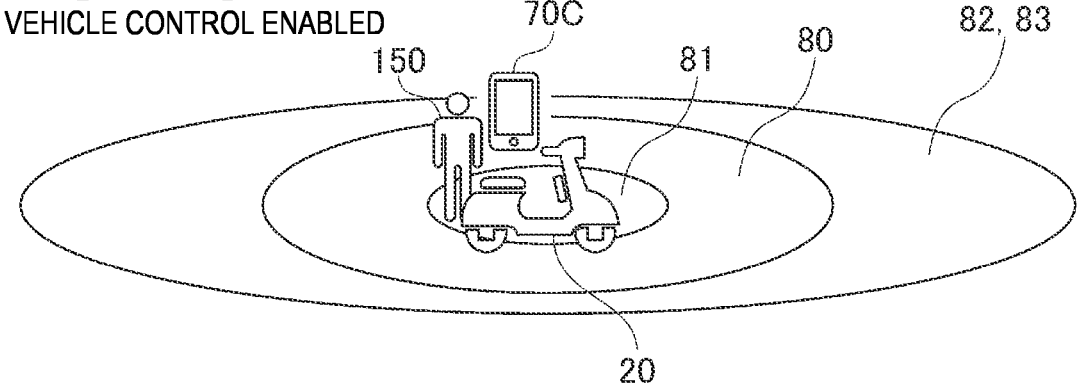

FIGS. 21A-21C are diagrams showing a case where vehicle control is possible and a case where vehicle control is not possible in the vehicle control system 11 according to the present embodiment. As shown in FIG. 21A, when the electronic key 50C enters the first area 80 including the vehicle 20, the vehicle 20 (actually vehicle ECU 30C, the same applies to the following description) enters an operation waiting state in which an operation of the vehicle operation device 40 can be received, and vehicle control is enabled. As shown in FIG. 21B, when the smartphone 70C does not enter the second area 81 (the electronic key 50C is not shown), the vehicle 20 does not enter an operation waiting state and vehicle control is disabled. As shown in FIG. 21C, when the smartphone 70C enters the second area 81 included in the first area 80 and smaller than the first area 80, the vehicle 20 enters an operation waiting state, and vehicle control is enabled. In a case indicated by an arrow 90 in FIG. 20, that is, in a case where the electronic key 50C enters the first area 80 and the smartphone 70C does not enter the second area 81, the smartphone 70C generates the notification indicating that the vehicle 20 is in an operation waiting state (the smartphone 70C vibrates in FIG. 20).

When the vehicle ECU 30C is in an operation waiting state and the vehicle operation device 40 receives an operation (a predetermined operation, a first operation) of the switch 41, the vehicle ECU 30C enters a control enabled state. When the vehicle ECU 30C is not in an operation waiting state and the vehicle operation device 40 receives an operation (a predetermined operation, a first operation) of the switch 41, the vehicle ECU 30C does not enter a control enabled state. When the vehicle ECU 30C is in a control enabled state and receives an operation (a second operation) of the throttle of the vehicle operation device 40, the vehicle 20 moves forward. In this manner, when the vehicle ECU 30C is in an operation waiting state, the vehicle ECU 30C enters a control enabled state if the switch 41 is operated, and when the vehicle ECU 30C is in a control enabled state, the vehicle 20 moves forward if the throttle 42 is operated.

Figure 22:
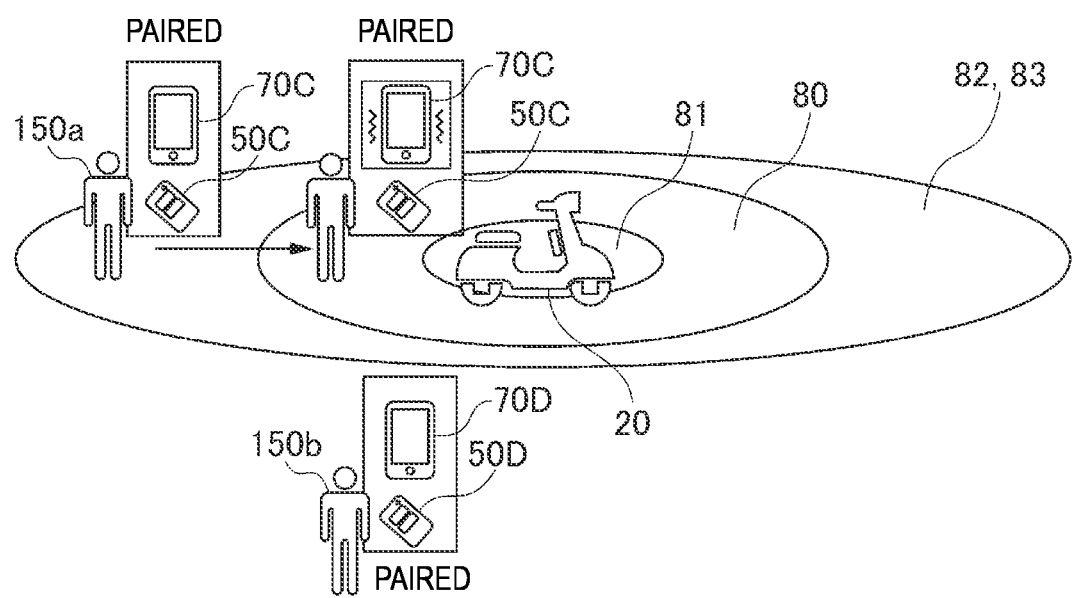
FIG. 22 is a diagram showing a case where an electronic key and a smartphone are paired with each other and a case where the electronic key and the smartphone are not paired with each other in the vehicle control system according to the second embodiment.

The electronic key 50C and the smartphone 70C are paired with each other, so that the smartphone 70C is notified that the vehicle 20 can be activated when the electronic key 50C enters the first area 80. The electronic key 50C and the smartphone 70C are paired with each other, so that a smartphone that is not paired with the electronic key 50C is not notified. FIG. 22 is a diagram showing a case where the electronic key 50C and the smartphone 70C are paired with each other and a case where the electronic key 50C and the smartphone 70C are not paired with each other in the vehicle control system 11 according to the present embodiment. When the electronic key 50C enters the first area 80, the smartphone 70C of a user 150*a* carrying the electronic key 50C and the smartphone 70C that are paired with each other is notified, but when the electronic key 50C does not enter the first area 80, a smartphone 70D of a user 150*b* carrying an electronic key 50D and a smartphone 70D that are paired with each other is not notified. Although the electronic key 50C and the smartphone 70C communicate with each other via the vehicle ECU 30C, the electronic key 50C and the smartphone 70C may directly communicate with each other.

The electronic key 50C includes the LED 52 described above, and the LED 52 displays information indicating that the vehicle 20 is in an operation waiting state. In this case, attention of the user 150 can be drawn and information indicating that the vehicle 20 is in an operation waiting state can be transmitted, by blinking of the LED 52 when the vehicle 20 is in an operation waiting state. On the other hand, the smartphone 70C includes the display 73 described above, and the display device 73 displays a predetermined image indicating that the vehicle 20 is in an operation waiting state. The smartphone 70C includes the vibrator 74 described above, and the vibrator 74 generates the notification indicating that the vehicle 20 is in an operation waiting state using vibration.

The smartphone 70C includes the speaker 75 described above, and the speaker 75 generates the notification indicating that the vehicle 20 is in an operation waiting state using a sound. The smartphone 70C includes the buzzer 76 described above, and the buzzer 76 generates the notification indicating that the vehicle 20 is in an operation waiting state using a beep sound. The notification indicating that the vehicle 20 is in an operation waiting state does not need to be made by all of the display 73, the vibrator 74, the speaker 75, and the buzzer 76. The user 150 may select any one of them to make a notification. For example, in a case where the display 73 and the vibrator 74 are selected, when the vehicle 20 enters an operation waiting state, the display 73 displays an image indicating that the vehicle 20 is in an operation waiting state, and the vibrator 74 vibrates.

As described above, the electronic key 50C includes the first housing 51A, and the smartphone 70C includes the second housing 70A. A first volume of the first housing 51A is smaller than a second volume of the second housing 70A. Since the electronic key 50C has a smaller volume, it is easy to carry the electronic key 50C alone.

Next, an operation of the vehicle control system 11 according to the second embodiment will be described in detail.

Figure 23:
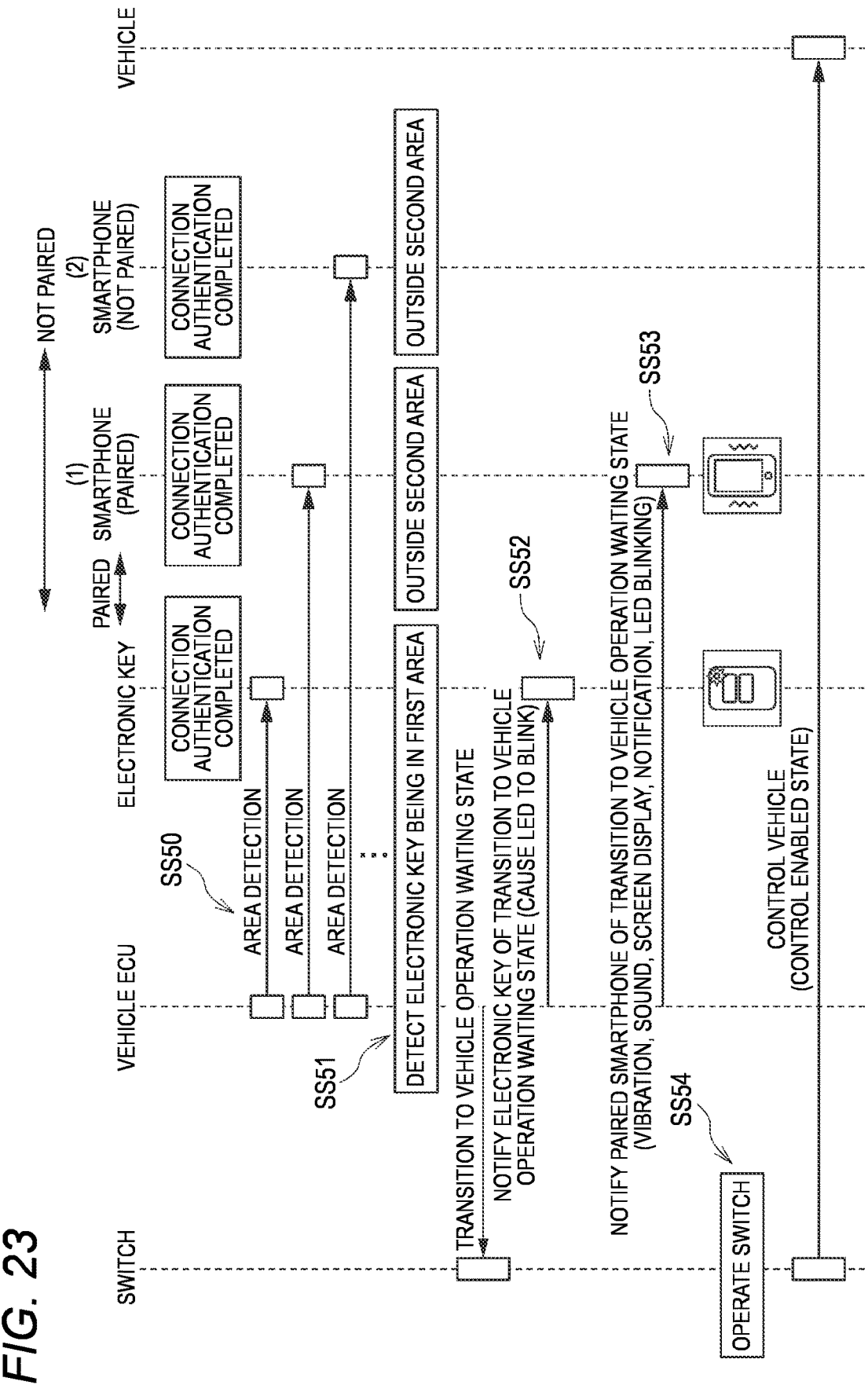
FIG. 23 is a sequence diagram showing a processing executed among the vehicle ECU, the electronic key, and the smartphone in the vehicle control system according to the second embodiment.

FIG. 23 is a sequence diagram showing a processing executed among the vehicle ECU, the electronic key, and the smartphone in the vehicle control system 11 according to the second embodiment. In the processing shown in FIG. 23, the vehicle ECU 30C notifies the smartphone 70C(1) paired with the electronic key 50C of transition to a vehicle operation waiting state. In FIG. 23, in a situation where the electronic key 50C enters the third area 82 and connection authentication is completed, and the smartphone 70C(1) paired with the electronic key 50C and the smartphone 70C(2) not paired with the electronic key 50C enters the fourth area 83 and connection authentication is completed, the vehicle ECU 30C detects an area for each of the electronic key 50C and the smartphones 70C(1) and 70C(2) (SS50). When the vehicle ECU 30C detects that the electronic key 50C is present in the first area 80 (SS51), the vehicle ECU 30C notifies the electronic key 50C of the transition to a vehicle operation waiting state, and the LED 52 of the electronic key 50C blinks (SS52). The vehicle ECU 30C further notifies the smartphone 70C(1) paired with the electronic key 50C of the transition to a vehicle operation waiting state, and smartphone 70C(1) vibrates, makes a sound, displays a screen, makes a notification, and the LED blinks (SS53). When the vehicle ECU 30C enters a vehicle operation waiting state, the vehicle 20 can be controlled (in a control enabled state) by an operation of the switch 41 of the operation device 40 (SS54).

Figure 24:
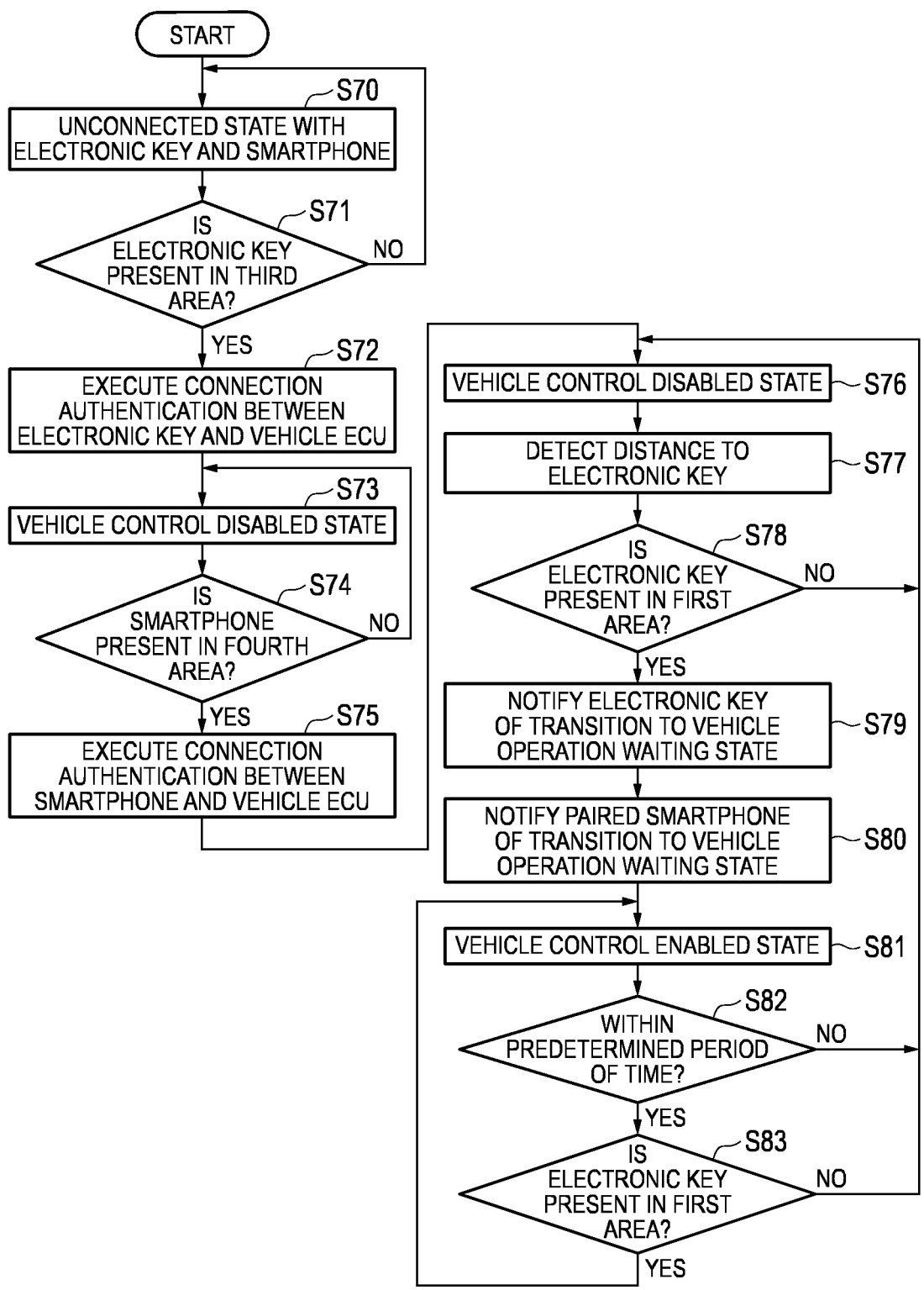
FIG. 24 is a flowchart showing an operation of the vehicle ECU of the vehicle control system according to the second embodiment.
Figure 25:
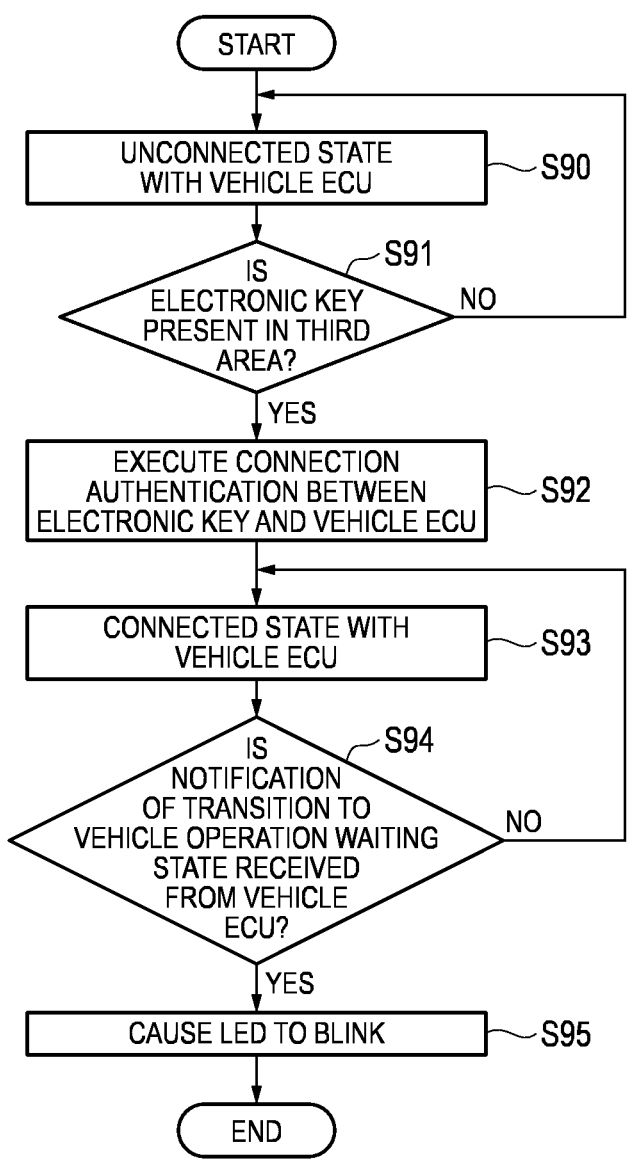
FIG. 25 is a flowchart showing an operation of the electronic key of the vehicle control system according to the second embodiment.
Figure 26:
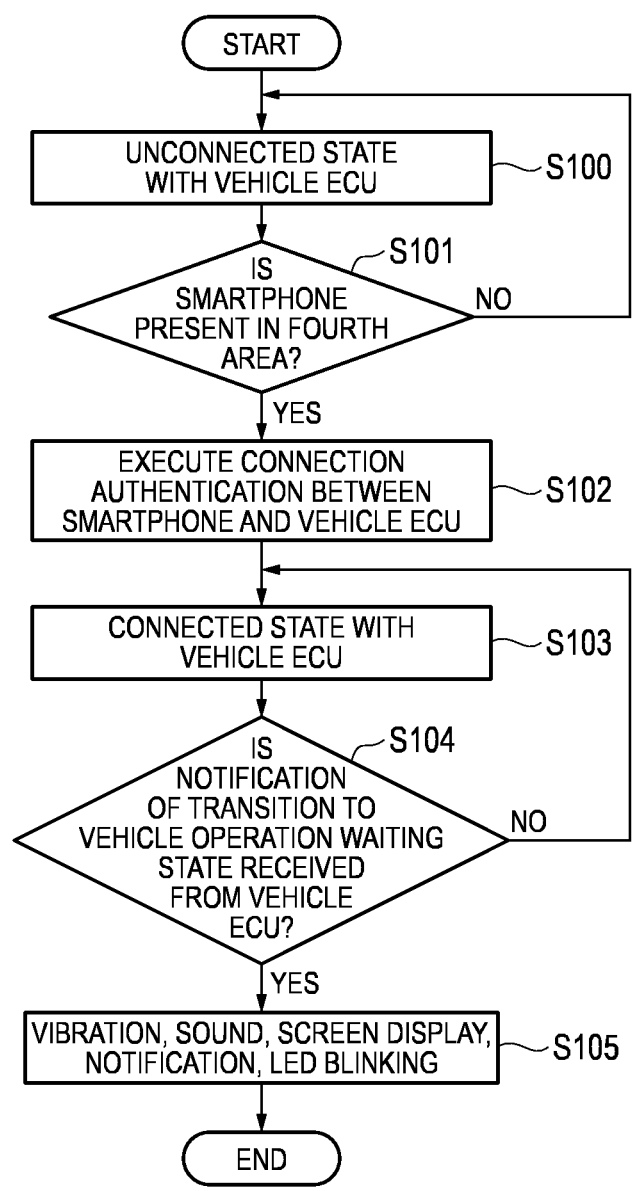
FIG. 26 is a flowchart showing an operation of the smartphone of the vehicle control system according to the second embodiment.

FIG. 24 to FIG. 26 are flowcharts showing operations of the vehicle control system 11 according to the second embodiment. The flowcharts in FIG. 24 to FIG. 26 show the processing shown in the sequence diagram in FIG. 23 in detail. In FIG. 24, the vehicle ECU 30C confirms that the vehicle ECU 30C is not connected with the electronic key 50C and the smartphone 70C (step S70), and then determines whether the electronic key 50C is present in the third area 82 (step S71). When it is determined that the electronic key 50C is not present in the third area 82 ("NO" in step S71), the processings in steps S70 and S71 are repeated until it is determined that the electronic key 50C is present in the third area 82. On the other hand, when it is determined that the electronic key 50C is present in the third area 82 ("YES" in step S71), connection authentication between the electronic key 50C and the vehicle ECU 30C is executed (step S72). After the connection authentication between the vehicle ECU 30C and the electronic key 50C is executed, the vehicle ECU 30C confirms that the vehicle ECU 30C is in a vehicle control disabled state (step S73). Thereafter, the vehicle ECU 30C determines whether the smartphone 70C is present in the fourth area 83 (step S74).

When it is determined that the smartphone 70C is not present in the fourth area 83 ("NO" in step S74), the processings in steps S73 and S74 are repeated until it is determined that the smartphone 70C is present in the fourth area 83. On the other hand, when it is determined that the smartphone 70C is present in the fourth area 83 ("YES" in step S74), connection authentication between the smartphone 70C and the vehicle ECU 30C is executed (step S75). After the connection authentication between the vehicle ECU 30C and the smartphone 70C is executed, the vehicle ECU 30C confirms the vehicle ECU 30C is in a vehicle control disabled state (step S76). Thereafter, the vehicle ECU 30C detects a distance to the electronic key 50C (step S77). The distance to the electronic key 50C is measured according to a method using RSSI, TOF, phase information of radio waves, or the like.

After the distance to the electronic key 50C is detected, the vehicle ECU 30C determines whether the electronic key 50C is present in the first area 80 (step S78). When it is determined that the electronic key 50C is not present in the first area 80 ("NO" in step S78), the processings in steps S76 to S78 are repeated until it is determined that the electronic key 50C is present in the first area 80. On the other hand, when it is determined that the electronic key 50C is present in the first area 80 ("YES" in step S78), the vehicle ECU 30C notifies the electronic key 50C of the transition to a vehicle operation waiting state (step S79). Next, the vehicle ECU 30C notifies the paired smartphone 70C of the transition to a vehicle operation waiting state (step S80).

Next, the vehicle ECU 30C confirms that the vehicle ECU 30C is in a vehicle control enabled state (step S81). Then, the vehicle ECU 30C determines whether an elapsed time from when the electronic key 50C enters the first area 80 is within a predetermined period of time (step S82). When it is determined that the elapsed time is not within the predetermined period of time ("NO" in step S82), the processing returns to step S76, and the vehicle ECU 30C enters a vehicle control disabled state. On the other hand, when it is determined that the elapsed time from when the electronic key 50C enters the first area 80 is within the predetermined period of time ("YES" in step S82), the vehicle ECU 30C determines whether the electronic key 50C is present in the first area 80 (step S83). When it is determined that the electronic key 50C is not present in the first area 80 ("NO" in step S83), the processing returns to step S76, and the vehicle ECU 30C enters a vehicle control disabled state. On the other hand, when it is determined that the electronic key 50C is present in the first area 80 ("YES" in step S83), the processing returns to step S81, and the vehicle ECU 30C enters a vehicle control enabled state.

In FIG. 25, the electronic key 50C confirms that the electronic key 50C is not connected with the vehicle ECU 30C (step S90), and then determines whether the electronic key 50C is present in the third area 82 (step S91). When it is determined that the electronic key 50C is not present in the third area 82 ("NO" in step S91), the processings in steps S90 and S91 are repeated until it is determined that the electronic key 50C is present in the third area 82. On the other hand, when it is determined that the electronic key 50C is present in the third area 82 ("YES" in step S91), connection authentication between the electronic key 50C and the vehicle ECU 30C is executed (step S92). After the connection authentication between the electronic key 50C and the vehicle ECU 30C is executed, the electronic key 50C confirms that the electronic key 50C is connected with the vehicle ECU 30C (step S93). Next, the electronic key 50C determines whether the electronic key 50C receives a notification of transition to a vehicle operation waiting state from the vehicle ECU 30C (step S94). When it is determined that the electronic key 50C does not receive the notification of transition to a vehicle operation waiting state ("NO" in step S94), the processing returns to step S93. On the other hand, when it is determined that the electronic key 50C receives the notification of transition to a vehicle operation waiting state ("YES" in step S94), the LED 52 blinks (step S95).

In FIG. 26, the smartphone 70C confirms that the smartphone 70C is not connected with the vehicle ECU 30C (step S100), and then determines whether the smartphone 70C is present in the fourth area 83 (step S101). When it is determined that the smartphone 70C is not present in the fourth area 83 ("NO" in step S101), the processings in steps S100 and S101 are repeated until it is determined that the smartphone 70C is present in the fourth area 83. On the other hand, when it is determined that the smartphone 70C is present in the fourth area 83 ("YES" in step S101), connection authentication between the smartphone 70C and the vehicle ECU 30C is executed (step S102). After the connection authentication between the smartphone 70C and the vehicle ECU 30C is executed, the smartphone 70C confirms that the smartphone 70C is connected with the vehicle ECU 30C (step S103). Next, the smartphone 70C determines whether the smartphone 70C receives a notification of transition to a vehicle operation waiting state from the vehicle ECU 30C (step S104). When it is determined that the smartphone 70C does not receive the notification of transition to a vehicle operation waiting state ("NO" in step S104), the processing returns to step S103. On the other hand, when it is determined that the smartphone 70C receives the notification of transition to a vehicle operation waiting state ("YES" in step S104), the smartphone 70C vibrates, makes a sound, displays a screen, makes a notification, and the LED blinks (steps S105).

Figure 27:
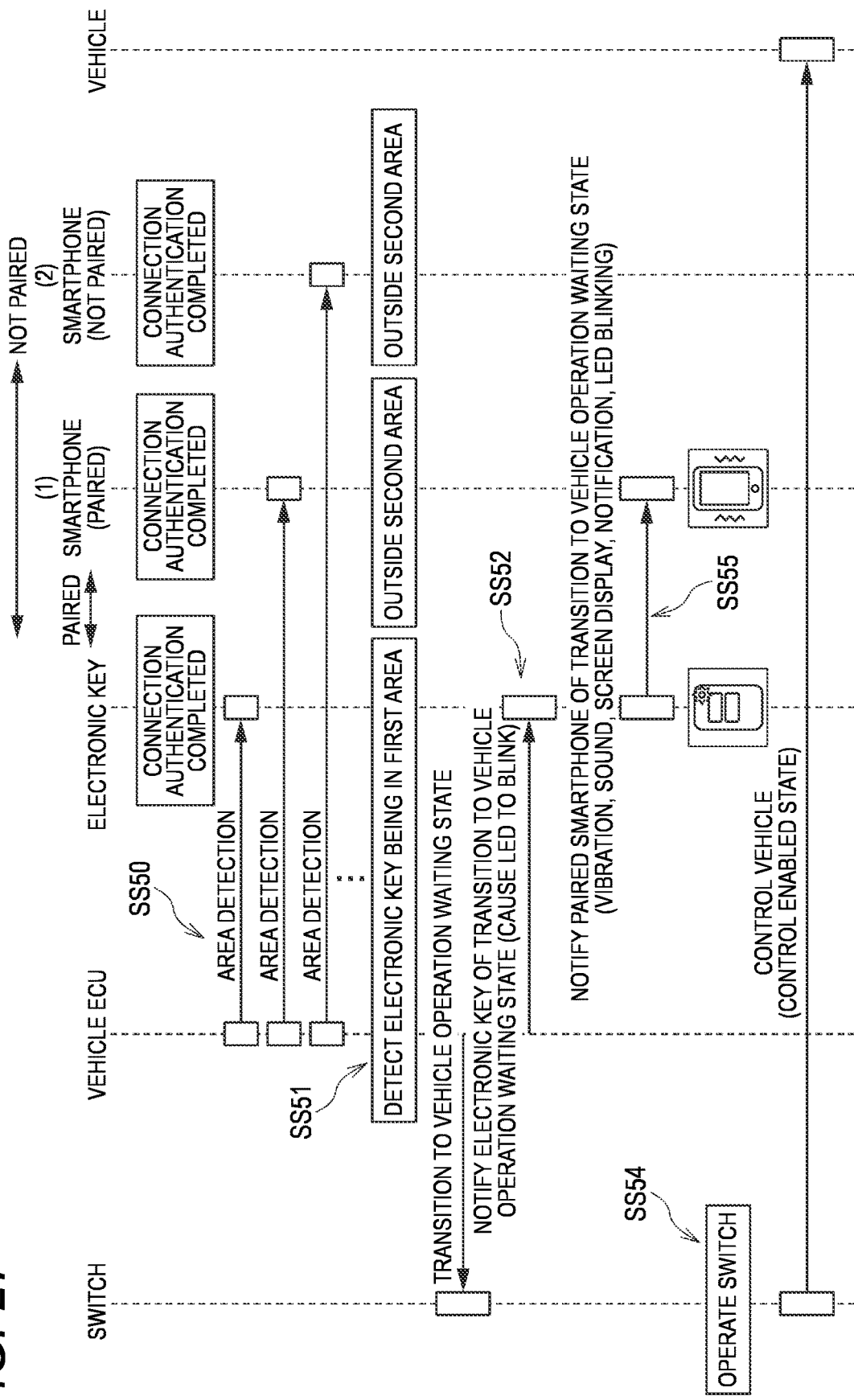
FIG. 27 is a sequence diagram showing a processing executed among the vehicle ECU, the electronic key, and the smartphone in the vehicle control system according to the second embodiment.

FIG. 27 is a sequence diagram showing a processing executed among the vehicle ECU, the electronic key, and the smartphone in the vehicle control system 11 according to the second embodiment. In the processing shown in FIG. 27, the electronic key 50C notifies the smartphone 70C(1) paired with the electronic key 50C of the transition to a vehicle operation waiting state. In FIG. 27, in a situation where the electronic key 50C enters the third area 82 and connection authentication is completed, and the smartphone 70C(1) paired with the electronic key 50C and the smartphone 70C(2) not paired with the electronic key 50C enters the fourth area 83 and connection authentication is completed, the vehicle ECU 30C detects an area for each of the electronic key 50C and the smartphones 70C(1) and 70C(2) (SS50). When the vehicle ECU 30C detects that the electronic key 50C is present in the first area 80 (SS51), the vehicle ECU 30C notifies the electronic key 50C of the transition to a vehicle operation waiting state, and the LED 52 of the electronic key 50C blinks (SS52). The electronic key 50C notifies the smartphone 70C(1) paired with the electronic key 50C of the transition to a vehicle operation waiting state, and smartphone 70C(1) vibrates, makes a sound, displays a screen, makes a notification, and the LED blinks (SS55). When the vehicle ECU 30C enters a vehicle operation waiting state, the vehicle 20 can be controlled (in a control enabled state) by an operation of the switch 41 of the operation device 40 (SS54).

Figure 28:
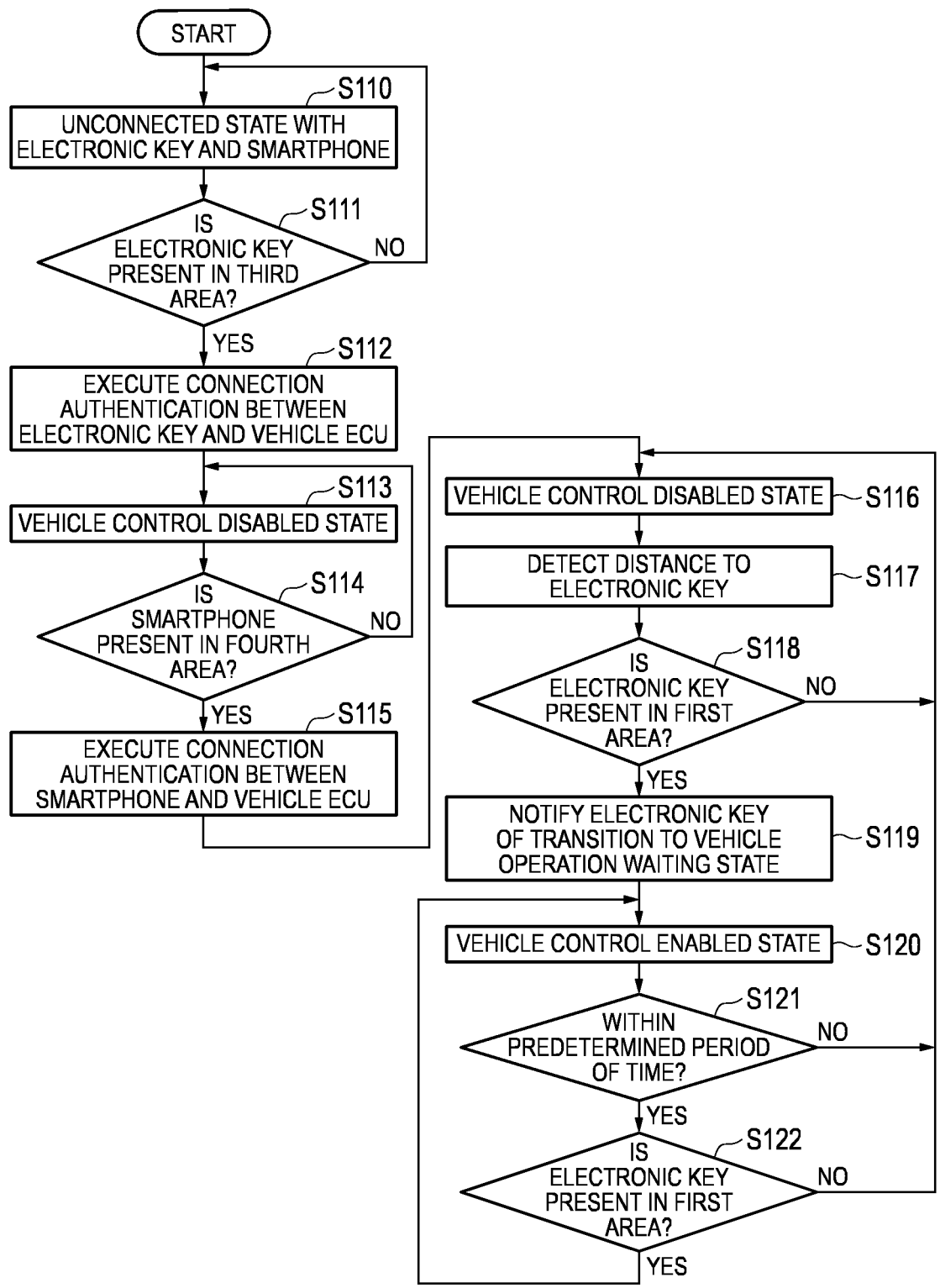
FIG. 28 is a flowchart showing an operation of the vehicle ECU of the vehicle control system according to the second embodiment.
Figure 29:
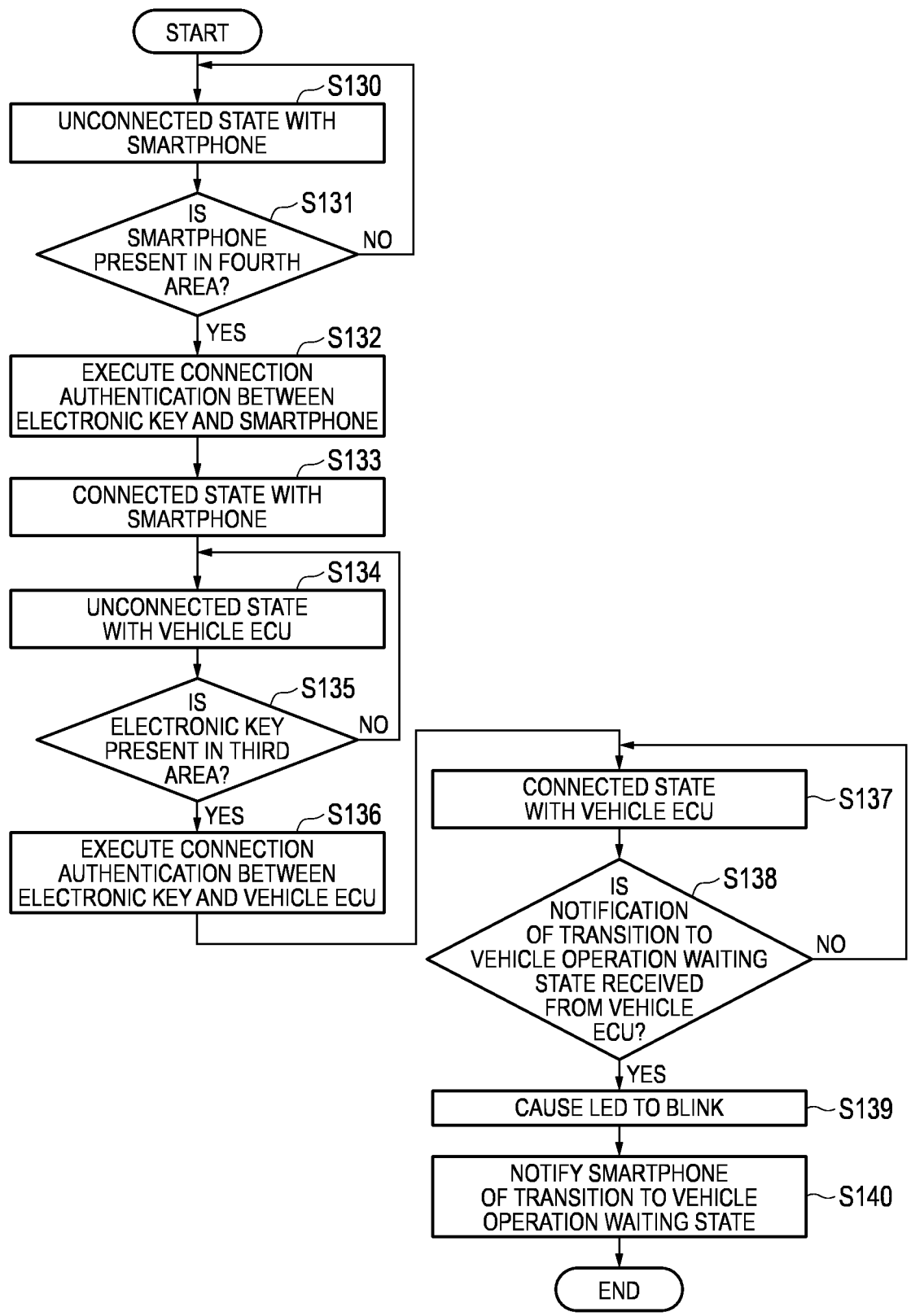
FIG. 29 is a flowchart showing an operation of the electronic key of the vehicle control system according to the second embodiment.
Figure 30:
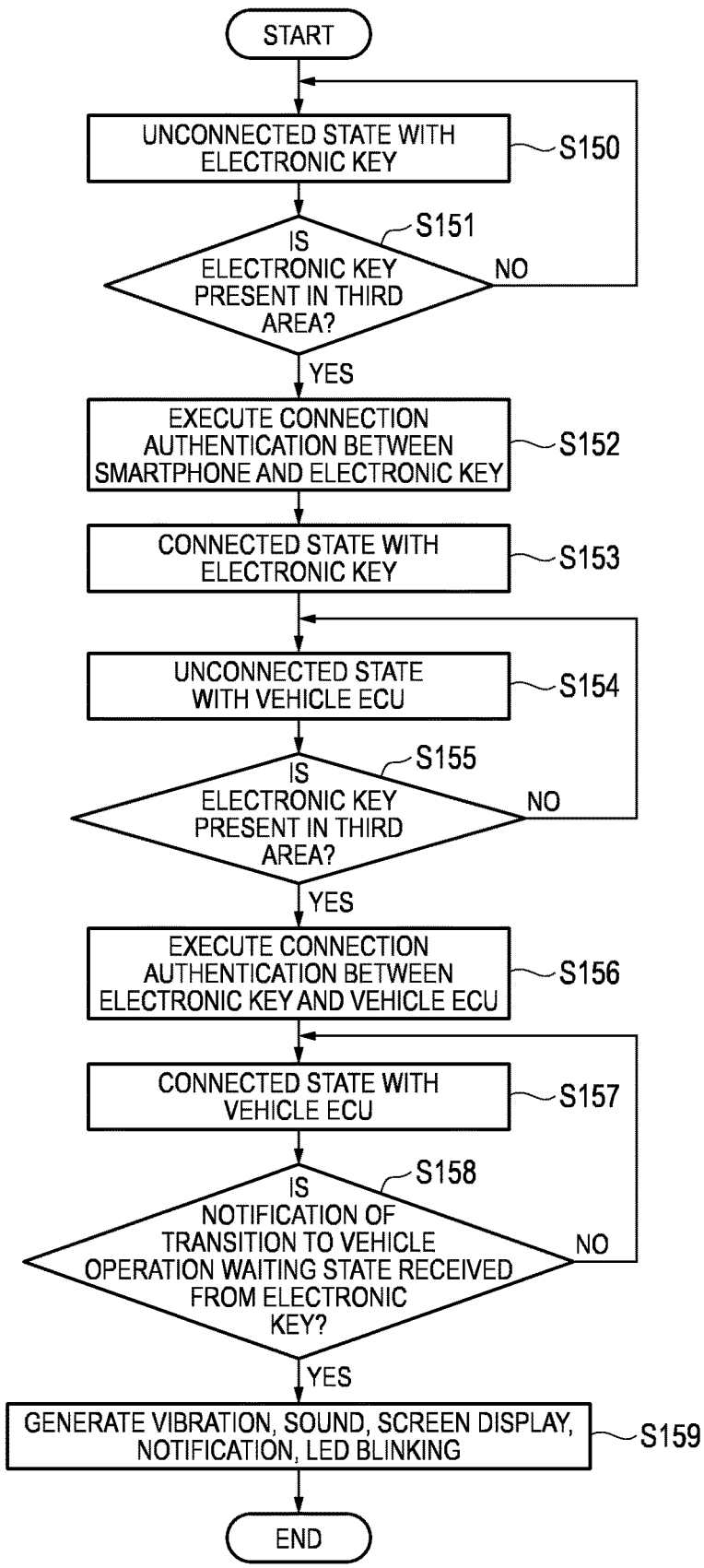
FIG. 30 is a flowchart showing an operation of the smartphone of the vehicle control system according to the second embodiment.

FIG. 28 to FIG. 30 are flowcharts showing operations of the vehicle control system 11 according to the second embodiment. The flowcharts in FIG. 28 to FIG. 30 show the processing shown in the sequence diagram in FIG. 27 in detail. In FIG. 28, the vehicle ECU 30 confirms that the vehicle ECU 30 is not connected with the electronic key 50C and the smartphone 70C (step S110), and then determines whether the electronic key 50C is present in the third area 82 (step S111). When it is determined that the electronic key 50C is not present in the third area 82 ("NO" in step S111), the processings in steps S110 and S111 are repeated until it is determined that the electronic key 50C is present in the third area 82. On the other hand, when it is determined that the electronic key 50C is present in the third area 82 ("YES" in step S111), connection authentication between the electronic key 50C and the vehicle ECU 30C is executed (step S112). After the connection authentication between the vehicle ECU 30C and the electronic key 50C is executed, the vehicle ECU 30C confirms that the vehicle ECU 30C is in a vehicle control disabled state (step S113). Thereafter, the vehicle ECU 30C determines whether the smartphone 70C is present in the fourth area 83 (step S114).

When it is determined that the smartphone 70C is not present in the fourth area 83 ("NO" in step S114), the processings in steps S113 and S114 are repeated until it is determined that the smartphone 70C is present in the fourth area 83. On the other hand, when it is determined that the smartphone 70C is present in the fourth area 83 ("YES" in step S114), connection authentication between the smartphone 70C and the vehicle ECU 30C is executed (step S115). After the connection authentication between the vehicle ECU 30C and the smartphone 70C is executed, the vehicle ECU 30C confirms the vehicle ECU 30C is in a vehicle control disabled state (step S116). Thereafter, the vehicle ECU 30C detects a distance to the electronic key 50C (step S117). The distance to the electronic key 50C is measured according to a method using RSSI, TOF, phase information of radio waves, or the like.

After the distance to the electronic key 50C is detected, the vehicle ECU 30 determines whether the electronic key 50C is present in the first area 80 (step S118). When it is determined that the electronic key 50C is not present in the first area 80 ("NO" in step S118), the processings in steps S116 to S118 are repeated until it is determined that the electronic key 50C is present in the first area 80. On the other hand, when it is determined that the electronic key 50C is present in the first area 80 ("YES" in step S118), the vehicle ECU 30C notifies the electronic key 50C of the transition to a vehicle operation waiting state (step S119).

Next, the vehicle ECU 30C confirms that the vehicle ECU 30C is in a vehicle control enabled state (step S120). Then, the vehicle ECU 30C determines whether an elapsed time from when the electronic key 50C enters the first area 80 is within a predetermined period of time (step S121). When it is determined that the elapsed time is not within the predetermined period of time ("NO" in step S121), the processing returns to step S116, and the vehicle ECU 30C enters a vehicle control disabled state. On the other hand, when it is determined that the elapsed time from when the electronic key 50C enters the first area 80 is within the predetermined period of time ("YES" in step S121), the vehicle ECU 30C determines whether the electronic key 50C is present in the first area 80 (step S122). When it is determined that the electronic key 50C is not present in the first area 80 ("NO" in step S122), the processing returns to step S116, and the vehicle ECU 30C enters a vehicle control disabled state. On the other hand, when it is determined that the electronic key 50C is present in the first area 80 ("YES" in step S122), the processing returns to step S120, and the vehicle ECU 30C enters a vehicle control enabled state.

In FIG. 29, the electronic key 50C confirms that the electronic key 50C is not connected with the smartphone 70C (step S130), and then determines whether the smartphone 70C is present in the fourth area 83 (step S131). When it is determined that the smartphone 70C is not present in the fourth area 83 ("NO" in step S131), the processings in steps S130 and S131 are repeated until it is determined that the smartphone 70C is present in the fourth area 83. On the other hand, when it is determined that the smartphone 70C is present in the fourth area 83 ("YES" in step S131), connection authentication between the electronic key 50C and the smartphone 70C is executed (step S132). After the connection authentication between the electronic key 50C and the smartphone 70C is executed, the electronic key 50C confirms that the electronic key 50C is connected with the smartphone 70C (step S133). Next, the electronic key 50C confirms that the electronic key 50C is not connected with the vehicle ECU 30C (step S134). Thereafter, the electronic key 50C determines whether the electronic key 50C is present in the third area 82 (step S135).

When it is determined that the electronic key 50C is not present in the third area 82 ("NO" in step S135), the processings in steps S134 and S135 are repeated until it is determined that the electronic key 50C is present in the third area 82. On the other hand, when it is determined that the electronic key 50C is present in the third area 82 ("YES" in step S135), connection authentication between the electronic key 50C and the vehicle ECU 30C is executed (step S136). After the connection authentication between the electronic key 50C and the vehicle ECU 30C is executed, the electronic key 50C confirms that the electronic key 50C is connected with the vehicle ECU 30C (step S137).

After confirming that the electronic key 50C is connected with the vehicle ECU 30C, the electronic key 50C determines whether the electronic key 50C receives a notification of transition to a vehicle operation waiting state from the vehicle ECU 30 (step S138). When it is determined that the electronic key 50C does not receive the notification of transition to a vehicle operation waiting state from the vehicle ECU 30 ("NO" in step S138), the processings in steps S137 and S138 are repeated until it is determined that the electronic key 50C receives the notification of transition to a vehicle operation waiting state from the vehicle ECU 30. On the other hand, when it is determined that the electronic key 50C receives the notification of transition to a vehicle operation waiting state from the vehicle ECU 30 ("YES" in step S138), the LED 52 blinks (step S139). Next, the electronic key 50C notifies the smartphone 70C of the transition to a vehicle operation waiting state (step S140).

In FIG. 30, the smartphone 70C confirms that the smartphone 70C is not connected with the electronic key 50C (step S150), and then determines whether the electronic key 50C is present in the third area 82 (step S151). When it is determined that the electronic key 50C is not present in the third area 82 ("NO" in step S151), the processings in steps S150 and S151 are repeated until it is determined that the electronic key 50C is present in the third area 82. On the other hand, when it is determined that the electronic key 50C is present in the third area 82 ("YES" in step S151), connection authentication between the smartphone 70C and the electronic key 50C is executed (step S152). After the connection authentication between the smartphone 70C and the electronic key 50C is executed, the smartphone 70C confirms that the smartphone 70C is connected with the electronic key 50C (step S153). Next, the smartphone 70C confirms that the smartphone 70C is not connected with the vehicle ECU 30C (step S154).

Next, the smartphone 70C determines whether the electronic key 50C is present in the third area 82 (step S155). When it is determined that the electronic key 50C is not present in the third area 82 ("NO" in step S155), the processings in steps S154 and S155 are repeated until it is determined that the electronic key 50C is present in the third area 82. On the other hand, when it is determined that the electronic key 50C is present in the third area 82 ("YES" in step S155), connection authentication between the electronic key 50C and the vehicle ECU 30C is executed (step S156). After the connection authentication between the electronic key 50C and the vehicle ECU 30C is executed, the smartphone 70C confirms that the smartphone 70C is connected with the vehicle ECU 30C (step S157).

After confirming that the smartphone 70C is connected with the vehicle ECU 30C, the smartphone 70C determines whether the smartphone 70C receives the notification of transition to a vehicle operation waiting state from the electronic key 50C (step S158). When it is determined that the smartphone 70C does not receive the notification of transition to a vehicle operation waiting state from the electronic key 50C ("NO" in step S158), the processings in steps S157 and S158 are repeated until it is determined that the smartphone 70C receives the notification of transition to a vehicle operation waiting state from the electronic key 50C. On the other hand, when it is determined that the smartphone 70C receives the notification of transition to a vehicle operation waiting state from the electronic key 50C ("YES" in step S158), the smartphone 70C vibrates, makes a sound, displays a screen, makes a notification, and causes the LED to blink (step S159).

Figure 31:
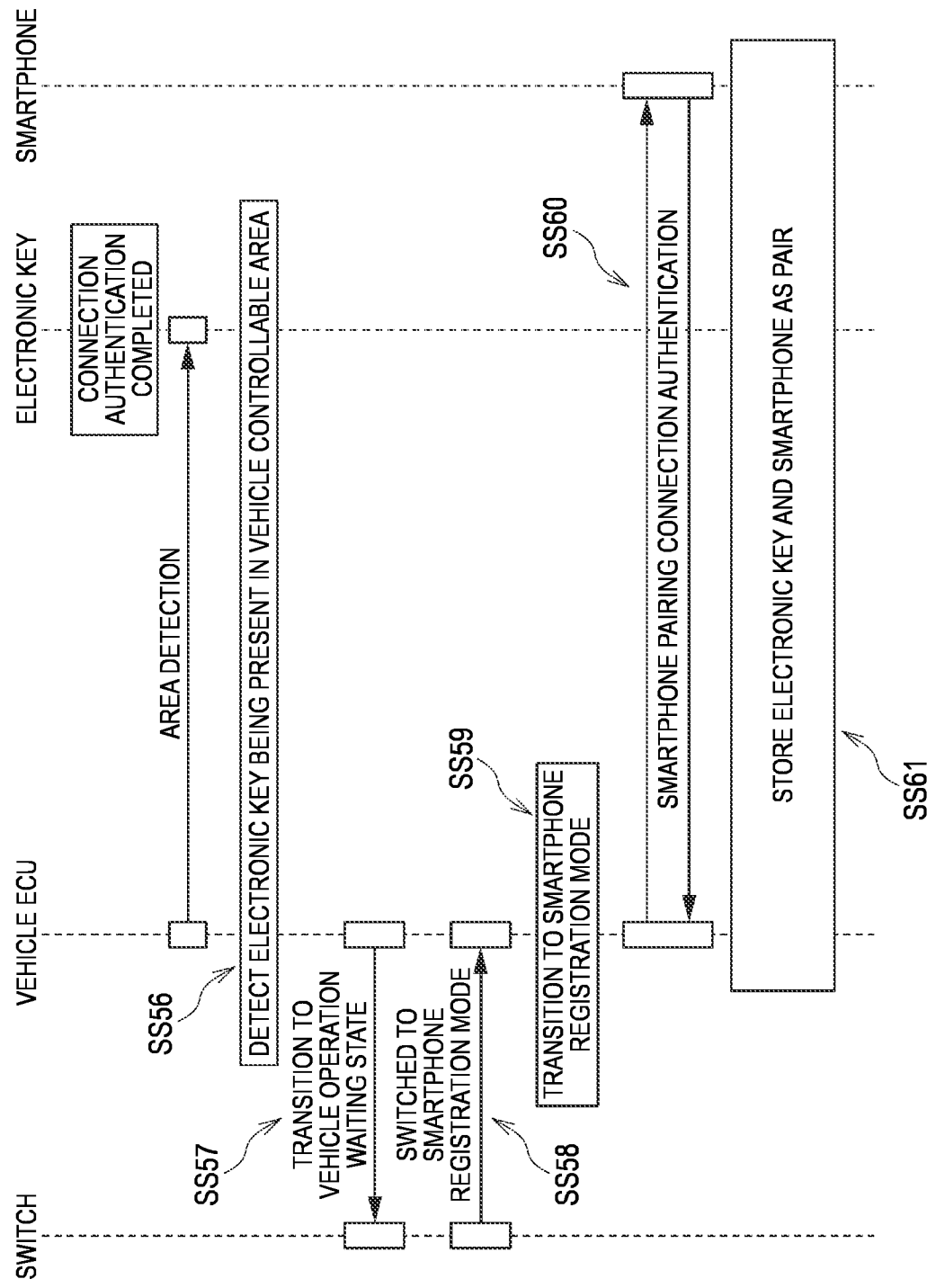
FIG. 31 is a sequence diagram showing a processing of pairing the electronic key with the smartphone in the vehicle control system according to the second embodiment.

FIG. 31 is a sequence diagram showing a processing of pairing the electronic key 50C with the smartphone 70C in the vehicle control system 11 according to the second embodiment. In FIG. 31, when the vehicle ECU 30C detects that the electronic key 50C is in a vehicle controllable area (first area 80) under a situation where the electronic key 50C enters the third area 82 and connection authentication is completed (SS56), the vehicle ECU 30C transitions to a vehicle operation waiting state (SS57). Thereafter, when a switch (not shown) for switching to a smartphone registration mode is operated by the operation device 40 (SS58), the vehicle ECU 30C transitions to a smartphone registration mode (SS59). When the vehicle ECU 30C transitions to the smartphone registration mode, smartphone pairing connection authentication between the vehicle ECU 30C and the smartphone 70C is executed (SS60). After the smartphone pairing connection authentication is executed, the electronic key 50C and the smartphone 70C are stored as a pair (SS61).

As described above, the vehicle control system 11 according to the second embodiment uses the smartphone 70C including a notification device such as the LED 72, the display 73, the vibrator 74, the speaker 75, and the buzzer 76. When the electronic key 50C enters the first area 80, the notification device of the smartphone 70C generates the notification indicating that the vehicle is in a vehicle control enabled state. Therefore, it is possible to easily and reliably know whether the vehicle is in a vehicle control enabled state.

In the vehicle control system 11 according to the second embodiment, Bluetooth™ is used in wireless communication among the vehicle 20, the electronic key 50C, and the smartphone 70C. Therefore, power consumption among communication devices can be reduced.

In the vehicle control system 11 according to the second embodiment, when the electronic key 50C enters the third area 82, connection authentication between the electronic key 50C and the vehicle 20 is executed. Therefore, it is possible to shorten a period of time up to when the vehicle 20 is in a vehicle control enabled state compared with a case where connection authentication is executed when the switch 41 of the vehicle operation device 40 is operated.

In the vehicle control system 11 according to the second embodiment, when the smartphone 70C enters the fourth area 83 including the first area 80 and larger than the first area 80, connection authentication between the smartphone 70C and the vehicle 20 is executed. Therefore, it is possible to shorten a period of time up to when the vehicle 20 is in a vehicle control enabled state compared with a case where connection authentication is executed when the switch 41 of the vehicle operation device 40 is operated.

In the vehicle control system 11 according to the second embodiment, the electronic key 50C and the smartphone 70C are paired with each other, and other smartphones that are not paired with the electronic key 50C cannot know that the vehicle 20 is in a vehicle control enabled state. Therefore, security can be improved.

In the vehicle control system 11 according to the second embodiment, only when the vehicle 20 is in an operation waiting state, the operation device 40 receives an operation of the switch 41 to bring the vehicle 20 into a control enabled state. Therefore, the vehicle 20 can be reliably brought into a control enabled state.

In the vehicle control system 11 according to the second embodiment, communication between the electronic key 50C and the smartphone 70C is executed via the vehicle 20 (the vehicle ECU 30C). Therefore, the communication between the electronic key 50C and the smartphone 70C can be managed in the vehicle 20.

In the vehicle control system 11 according to the second embodiment, a volume of the electronic key 50C is smaller than a volume of the smartphone 70C. Therefore, it is easy to carry the electronic key 50C.

In the vehicle control system 11 according to the second embodiment, the communication between the electronic key 50C and the smartphone 70C is executed via the vehicle ECU 30C. Alternatively, the electronic key 50C and the smartphone 70C can directly communicate with each other. In this case, it is possible to speed up particularly a processing that does not require intervention of the vehicle ECU 30C, that is, a processing related only to the electronic key 50C and the smartphone 70C.

Although the present disclosure has been described in detail with reference to specific embodiments, it will be apparent to those skilled in the art that various changes and modifications can be made without departing from the spirit and the scope of the present disclosure.

The present disclosure provides a vehicle control system including: a vehicle including an operation device; a first communication device configured to wirelessly communicate with the vehicle; and a second communication device configured to wirelessly communicate with the vehicle, wherein in a case in which the first communication device is positioned in a first area containing a position of the vehicle, the vehicle operates in an operation waiting state in which the operation device is allowed to receive an operation, wherein in a case in which the first communication device is not positioned in the first area, the vehicle does not operate in the operation waiting state, wherein in a case in which the second communication device is positioned in a second area contained in the first area and smaller than the first area, the vehicle operates in the operation waiting state, wherein in a case in which the second communication device is not positioned in the second area, the vehicle does not operate in the operation waiting state, and wherein in a case in which the first communication device is positioned in the first area and the second communication device is positioned in the second area, the second communication device generates a second notification indicating that the vehicle is in the operation waiting state.

According to the present disclosure, the second communication device (for, a smartphone) including a notification device such as a display, a vibrator, a speaker, and a buzzer is used. In a case in which the first communication device (for example, an electronic key) is positioned in the first area and the second communication device is not positioned in the second area, the second communication device generates the notification indicating that the vehicle is in an operation waiting state. Therefore, even the first communication device does not include the notification device such as a display, a vibrator, a speaker, and a buzzer, it is possible to reliably generate the notification indicating that the vehicle operates in the operation waiting state.

In the vehicle control system according to the present disclosure, in the above configuration, the first communication device and the second communication device are paired with each other.

According to the present disclosure, it is possible to easily know that the vehicle is in the operation waiting state using the second communication device, and since other second communication devices that are not paired with the first communication device cannot know an operable state of the vehicle, security can be improved.

In the vehicle control system according to the present disclosure, in the above configuration, in a case in which the operation device receives a predetermined operation during the vehicle being in the operation waiting state, the vehicle operates in a control enabled state, and in a case in which the operation device receives the predetermined operation during the vehicle not being in the operation waiting state, the vehicle does not operate in a control enabled state.

According to the present disclosure, the operation device receives the predetermined operation to bring the vehicle into the control enabled state only during the vehicle being in the operation waiting state, so that the vehicle can be reliably brought into the control enabled state.

In the vehicle control system according to the present disclosure, in the above configuration, the predetermined operation includes a first operation, and in a case in which the operation device receives a second operation during the vehicle being in the control enabled state, the vehicle moves forward.

According to the present disclosure, the operation device receives the second operation to enable the vehicle to move forward only during the vehicle being in the control enabled state, so that the vehicle can reliably move forward when the electronic key is present in the vicinity of the vehicle.

In the vehicle control system according to the present disclosure, in the above configuration, the operation device includes a switch and a throttle, the switch is configured to receive the first operation, and the throttle is configured to receive the second operation.

According to the present disclosure, since the switch receives the first operation and the throttle receives the second operation, the vehicle can be brought into the control enabled state by operating the switch, and the vehicle can move forward by operating the throttle when the vehicle is in the control enabled state.

In the vehicle control system according to the present disclosure, in the above configuration, in a case in which the first communication device is positioned in the first area, the first communication device notifies the second communication device that the vehicle is ready to be activated.

According to the present disclosure, when the first communication device is positioned in the first area, the second communication device is notified that the vehicle can be activated, so that it is possible to know that the vehicle can be activated using the second communication device.

In the vehicle control system according to the present disclosure, in the above configuration, the first communication device and the second communication device are configured to communicate with each other via the vehicle.

According to the present disclosure, since the communication between the first communication device and the second communication device is executed via the vehicle, the communication between the first communication device and the second communication device can be managed in the vehicle.

In the vehicle control system according to the present disclosure, in the above configuration, the first communication device and the second communication device are configured to directly communicate with each other.

According to the present disclosure, since the first communication device and the second communication device can directly communicate with each other, it is possible to speed up a processing that does not require intervention of the vehicle, that is, a processing related only to the first communication device and the second communication device.

In the vehicle control system according to the present disclosure, in the above configuration, the first communication device includes a first display, and the first display are configured to display a first notification indicating that the vehicle is in the operation waiting state.

According to the present disclosure, since there is provided the first display that can display information indicating that the vehicle is in the operation waiting state, it is possible to reliably know that the vehicle is in the operation waiting state.

In the vehicle control system according to the present disclosure, in the above configuration, the first display includes an LED.

According to the present disclosure, since the LED is used as the first display, good visibility can be obtained, power saving can be achieved, the first communication device can be used for a long period of time, and the first communication device can be miniaturized. When a high-luminance LED is used as the LED, visibility can be ensured even under sunlight, and it is possible to more reliably know that the vehicle is in the operation waiting state.

In the vehicle control system according to the present disclosure, in the above configuration, the LED is configured to blink to display the first notification indicating that the vehicle is in the operation waiting state.

According to the present disclosure, since the LED blinks, it is possible to more reliably know that the vehicle is in the operation waiting state.

In the vehicle control system according to the present disclosure, in the above configuration, the second communication device includes a second display, and the second display is configured to display the second notification indicating that the vehicle is in the operation waiting state.

According to the present disclosure, since there is provided the second display that can display information indicating that the vehicle is in the operation waiting state, it is possible to reliably know that the vehicle is in the operation waiting state.

In the vehicle control system according to the present disclosure, in the above configuration, the second display is configured to display an image, and the second display displays a predetermined image as the second notification indicating that the vehicle is in the operation waiting state.

According to the present disclosure, since the second display displays an image indicating that the vehicle is in the operation waiting state, it is possible to reliably generate the notification indicating that the vehicle is in the operation waiting state.

In the vehicle control system according to the present disclosure, in the above configuration, the second communication device includes a vibrator, and the vibrator is configured to vibrate to generate the second notification indicating that the vehicle is in the operation waiting state.

According to the present disclosure, since the second communication device generates the notification indicating that the vehicle is in the operation waiting state using vibration of the vibrator, it is possible to reliably notify that the vehicle is in the operation waiting state.

In the vehicle control system according to the present disclosure, in the above configuration, the second communication device includes a speaker, and the speaker is configured to output a sound to generate the second notification indicating that the vehicle is in the operation waiting state.

According to the present disclosure, since the second communication device generates the notification indicating that the vehicle is in the operation waiting state using a sound from the speaker, it is possible to reliably notify that the vehicle is in the operation waiting state.

In the vehicle control system according to the present disclosure, in the above configuration, the wireless communication complies with Bluetooth™.

According to the present disclosure, since Bluetooth™ is used for wireless communication, power consumption of a communication device can be reduced. That is, since Bluetooth™ is a communication method for executing periodic communication, it is possible to reduce power consumption by using this communication method.

In the vehicle control system according to the present disclosure, in the above configuration, the first communication device includes a first housing, the second communication device includes a second housing, and a first volume of the first housing is smaller than a second volume of the second housing.

According to the present disclosure, since a volume of the first communication device is smaller than a volume of the second communication device, it is easy to carry the first communication device.

In the vehicle control system according to the present disclosure, in the above configuration, in a case in which the first communication device is positioned in a third area containing the first area and larger than the first area, connection authentication of a wireless connection between the first communication device and the vehicle is executed, and in a case in which the first communication device is not positioned in the third area, the connection authentication of the wireless connection between the first communication device and the vehicle is not executed.

According to the present disclosure, in a case in which the first communication device is positioned in the third area, the connection authentication between the first communication device and the vehicle is executed, so that it is possible to shorten a period of time up to when the vehicle operates in the control enabled state compared with a case where the connection authentication is executed when a predetermined operation is performed.

In the vehicle control system according to the present disclosure, in the above configuration, in a case in which the second communication device is positioned in a fourth area containing the first area and larger than the first area, connection authentication of a wireless connection between the second communication device and the vehicle is executed, and in a case in which the second communication device is not positioned in the fourth area, the connection authentication of the wireless connection between the second communication device and the vehicle is not executed.

According to the present disclosure, in a case in which the second communication device is positioned in the fourth area containing the first area and larger than the first area, the connection authentication between the second communication device and the vehicle is executed, so that it is possible to shorten a period of time up to when the vehicle operates in the control enabled state compared with a case where the connection authentication is executed when a predetermined operation is performed.

In the vehicle control system according to the present disclosure, in the above configuration, the third area is identical with the fourth area.

According to the present disclosure, since the third area is identical with the fourth area, timing when connection authentication between the electronic key and the vehicle is executed can match with timing when connection authentication between the smartphone and the vehicle is executed. Since there are many opportunities in which the electronic key and the smartphone are carried together, it is possible to simplify a processing up to when the vehicle operates in the control enabled state by matching the timing when connection authentication between the electronic key and the vehicle is executed and the timing when connection authentication between the smartphone and the vehicle is executed.

The present application is based on Japanese Patent Application (Japanese Patent Application No. 2018-246032 and Japanese Patent Application No. 2018-246033) filed on Dec. 27, 2018, and contents thereof are incorporated herein by reference.

The vehicle control system according to the present disclosure is useful for a vehicle such as a motorcycle and an automobile.

What is claimed is:

1. A vehicle control system comprising:
a vehicle comprising an operation device; and
a communication device configured to wirelessly communicate with the vehicle,
wherein the vehicle control system includes a first area containing a position of the vehicle, a second area containing the position of the vehicle and smaller than the first area, and a third area containing the position of the vehicle and smaller than the second area,
wherein connection authentication of a wireless connection between the communication device and the vehicle is executed when the communication device is positioned in the first area,
wherein the vehicle operates in an operation waiting state in which the operation device is allowed to receive an operation when the communication device is positioned in the third area,
wherein the vehicle operates in the operation waiting state when the communication device is positioned in the second area excluding the third area,
wherein the vehicle does not operate in the operation waiting state when the communication device is positioned in the first area excluding the second area, and
wherein the vehicle operates in a control enabled state when the operation device receives a operation during the vehicle being in the operation waiting state, and
wherein the vehicle does not operate in a control enabled state when the operation device receives the operation during the vehicle not being in the operation waiting state.

2. The vehicle control system according to claim 1,
wherein the operation comprises a first operation, and
wherein the vehicle moves forward when the operation device receives a second operation during the vehicle being in the control enabled state.

3. The vehicle control system according to claim 2,
wherein the operation device comprises a switch and a throttle,
wherein the switch is configured to receive the first operation, and
wherein the throttle is configured to receive the second operation.

4. The vehicle control system according to claim 1,
wherein the communication device comprises a display, and
wherein the display is configured to display a notification indicating that the vehicle is in the operation waiting state.

5. The vehicle control system according to claim 4,
wherein the display comprises an LED.

6. The vehicle control system according to claim 5,
wherein the LED is configured to blink to display the notification indicating that the vehicle is in the operation waiting state.

7. The vehicle control system according to claim 4,
wherein the display is configured to display an image, and
wherein the display displays an image as the notification indicating that the vehicle is in the operation waiting state.

8. The vehicle control system according to claim 1,
wherein the communication device comprises a vibrator, and
wherein the vibrator is configured to vibrate to generate the notification indicating that the vehicle is in the operation waiting state.

9. The vehicle control system according to claim 1,
wherein the communication device comprises a speaker, and
wherein the speaker is configured to output a sound to generate the notification indicating that the vehicle is in the operation waiting state.

10. The vehicle control system according to claim 1,
wherein the communication device comprises a buzzer, and
wherein the buzzer is configured to output a beep sound to generate the notification indicating that the vehicle is in the operation waiting state.

11. The vehicle control system according to claim 1,
wherein after the communication device is positioned in the third area from an outside of the third area, during a period in which the communication device is positioned in at least the second area, when an elapsed time from when the communication device is positioned in the third area is larger than a predetermined period of time, the vehicle does not operate in the operation waiting state.

12. The vehicle control system according to claim 11,
wherein after the communication device is positioned in the third area from an outside of the third area, during a period in which the communication device is positioned in the second area excluding the third area, when an elapsed time from when the communication device is positioned in the third area is larger than the predetermined period of time, the vehicle does not operate in the operation waiting state.

13. The vehicle control system according to claim 1,
wherein the wireless communication complies with Bluetooth™.

* * * * *